(12) United States Patent
Van Bael et al.

(10) Patent No.: US 7,881,818 B2
(45) Date of Patent: Feb. 1, 2011

(54) FLEXIBLE PACKAGING INCORPORATING TWO-DIMENSIONAL GRAPHICS

(75) Inventors: Kristiaan K. A. Van Bael, Sint-Laureins (BE); Frank Adegeest, VC Hulst (NL)

(73) Assignee: Esko IP NV, Ghent (BE)

( * ) Notice: Subject to any disclaimer, the term of this patent is extended or adjusted under 35 U.S.C. 154(b) by 1128 days.

(21) Appl. No.: 11/537,282

(22) Filed: Sep. 29, 2006

(65) Prior Publication Data

US 2007/0083383 A1    Apr. 12, 2007

Related U.S. Application Data

(60) Provisional application No. 60/724,583, filed on Oct. 7, 2005.

(51) Int. Cl.
*G06F 19/00* (2006.01)
(52) U.S. Cl. .................. 700/98; 28/172.2; 53/427; 229/89; 700/182
(58) Field of Classification Search ........... 28/172.1, 28/172.2; 53/427; 229/89; 345/427; 700/90, 700/95, 97, 98, 182
See application file for complete search history.

(56) References Cited

U.S. PATENT DOCUMENTS 5,165,965 A * 11/1992 Martin ................... 427/256
2004/0129369 A1   7/2004 Johnson et al. ............ 156/85

OTHER PUBLICATIONS

Kobbelt et al., "A Shrink Wrapping Approach to Remeshing Polygonal Surfaces", The Eurographics Association and Blackwell Publishers, 1999, vol. 18 No. 3.*

Adobe Studio on Adobe Illustrator CS, "Shape graphic with warps and envelopes", Adobe Systems Incorporated, 2004.*

"Accuform T-SIM Reference Guide", Accuform, Zlin-Stipa, Czech Republic, downloaded on Feb. 13, 2007 and Feb. 15, 2007 from: http://www.t-sim.com/www/index.html.

P.N. Azariadis and N.A. Aspragathos, "On using planar developments to perform texture mapping on arbitrarily curved surfaces," Computers and Graphics, Pergamon Press Ltd., Oxford, GB, vol. 24, No. 4, Aug. 2000, pp. 539-554.

Dave Woods, "Shrink Sleeve Label Distortion," Gravure, Oct. 2005, pp. 30-34. Available online at: http://www.davewoods.us/pdf/GravureMagazineArticle.pdf.

(Continued)

*Primary Examiner*—Paul L Rodriguez
*Assistant Examiner*—Carlos Ortiz Rodriguez
(74) *Attorney, Agent, or Firm*—Dov Rosenfeld; Inventek

(57) ABSTRACT

A method to aid designing flexible packaging for wrapping around a solid object and finalizing the packaging. The method includes accepting a description of the surface of a sheet of packaging material after wrapping around the solid object and finalizing, using a mapping of points in the 2D plane of the sheet of the packaging material to the corresponding points in the 3D surface of the wrapped and finalized packaging. The method further includes displaying the surface of the wrapped and finalized packaging or displaying graphic elements on the surface of wrapped and finalized packaging. A version includes pre-distorting graphics to correct for any distortions to graphics that occur during the wrapping and finalizing process, and generating press-ready graphics from the pre-distorted graphics for printing onto the surface of the sheet of packaging material.

45 Claims, 17 Drawing Sheets

OTHER PUBLICATIONS

"ArtPro" Brochure, Artwork Systems N.V., Belgium, 2004. Downloaded Jan. 5, 2007 from http://www.artwork-systems.com/products/artpro/en/AWS_ArtPro.pdf.

"ArtiosCAD" Data Sheet, Esko-Graphics N.V, Gent, Belgium. Downloaded Jul. 1, 2005 from www.esko.com.

"PowerWarp User Guide: for ArtPro 7.0", Artwork Systems N.V., Gent, Belgium. Downloaded Jan. 5, 2007 from www.artwork-systems.com.

* cited by examiner

FLEXIBLE PACKAGING INCORPORATING TWO-DIMENSIONAL GRAPHICS

RELATED APPLICATIONS

The present invention claims priority of and is a conversion of U.S. Provisional Patent Application No. 60/724,583 filed Oct. 7, 2005 and titled "DESIGN OF FLEXIBLE PACKAGING INCORPORATING TWO-DIMENSIONAL GRAPHICS." The contents of such provisional patent application are incorporated herein by reference.

TECHNICAL FIELD

The present invention relates generally to computerized design of flexible packaging such as shrink packaging, and in particular, to a computer-implemented method, a software product, and an apparatus to aid in the design of flexible packaging such as shrink packaging that includes using a model of the three-dimensional shape of the packaging.

BACKGROUND

Shrink packaging is one example of flexible packaging, and is the process of wrapping a sleeve of flexible material, called a shrink sleeve, typically cylindrical, onto a three-dimensional typically solid object such as a bottle, a food item, several cans, and so forth, and then shrinking the material over the solid object. Graphics are typically printed on the sleeve prior to the shrinking. Shrink packaging is also called shrink-sleeve packaging.

Other forms of flexible packaging include flexible, elastic foils that are tightly wrapped around a solid material. While the description herein is mostly for the case of shrink sleeve packaging, the invention is also applicable to other forms of packaging where the printed substrate is locally shrunk or stretched.

FIG. 1 shows a typical workflow for producing shrink packaging. While FIG. 1 in general is prior art, when one or more of the processes shown in FIG. 1 include one or more elements of the present invention, not all elements of FIG. 1 are prior art.

One or more original graphic elements 101, e.g., from graphics files, are used to produce 102 press-ready graphics 103, e.g., a graphics file for printing onto a rectangular sheet of the material to be used in the wrapping, e.g., to be shrunk. The press-ready graphics 103 include the graphic elements 101 positioned as desired. The press-ready graphics 103 is aligned 104 then printed and cut into the sheet to form what is called herein a foldout sleeve 105. The foldout sleeve 105 is typically in the form of a rectangular sheet with the graphics printed thereon. There are two edges that are to be joined to form a generalized cylinder, that is, a tubular object whose cross-section is not necessarily circular, and may, for example, even be close to rectangular. These edges to be joined are called the seam edges, and also the seam lines herein. The foldout sleeve is joined 106 at the seam edges to form a seam, so that the foldout sleeve thus forms a cylinder, called the unshrunk sleeve 107 in the case of shrink packaging. While not shown here, the seams may actually overlap in an actual shrink packaging process. The unshrunk sleeve is therefore a shrink sleeve prior to the shrinking process. The unshrunk sleeve 107 (a generalized cylinder) is placed 108 over a 3D object 109, called the solid object herein. The combination 111 of the unshrunk sleeve 107 and the solid object 109 is passed through a process 112, e.g., an environment and process called a shrink tunnel that applies heat in one or more ways to shrink the unshrunk sleeve to form the shrink packaging 113 around the solid object 109

Note that the above description is provided for the purpose of describing the steps taken. The order of actions as described here may be, and in many actual production systems is different. The graphics are often printed on a rotation press, resulting in an almost endless chain of foldout sleeves. Then this chain is either seamed into a long cylinder, cut into single sleeves and placed over the solid object, or it is wrapped around the object, then cut and seamed.

When the unshrunk sleeve is shrunk, the graphics typically deform. Therefore, in the process 102 of preparing the press-ready graphics 103, an operator may manually pre-distort the graphic elements to compensate for the distortion that occurs during the shrinking process 112. By manually is meant manipulating the graphic elements on a computer. This is typically carried out by a trial and error process, with a series of pre-distortions. Such trial and error multi-step processing can be expensive. Thus there is a need in the art for tools to help this process of pre-distorting.

While the workflow description above is for shrink wrapping, those in the art will know that the features described can be readily generalized to the production of any curved surface carrying graphics, where the graphics are printed on a preform that is then shaped into a curved surface by means of a shaping process. The shaping process stretches and/or shrinks the printed substrate, and in the process, distorts the graphics that were printed on it. Production processes that fall under this more general description may include flexible sleeves that are tightly wrapped around an object and plastic or metal containers that are manufactured by embossing, blow molding, thermoforming or vacuum forming. Therefore, in a more general case, the original graphics 101 are used to produce the press ready graphics 103. The graphics are printed on a substrate and shaped into a preform, or in some embodiments, the graphics are printed directly onto the preform. The preform undergoes a shaping process to produce the final curved surface with the graphics printed thereon. The shaping process typically distorts the graphics. So in the process 102 of preparing the press-ready graphics 103, an operator may pre-distort the graphic elements as described in the previous paragraph.

In creating the various electronic files, a graphics artist is concerned with the producing and placing of the various graphic elements to produce the press-ready graphics 103.

It can be very challenging to design and print graphics on a substrate to ensure that after the unshrunk sleeve is shrunk, that the various graphic images will have been printed with proper orientation, sizing, good registration, and no or little perceptible distortion viewable after the shrinking. Designing and creating such graphics is both labor intensive and very prone to error It is for example difficult to visualize how the graphic elements will become distorted. It further is difficult to know how best to pre-distort the graphic elements in the producing of the press-ready graphics. It would be advantageous to be able to use a 3D model of the solid object and a physical model of the process of shrinking to automatically pre-distort the image. It also would be advantageous to be able to view in a 3D rendering how such pre-distorted graphics would appear after the shrinking.

Prior art approval processes for shrink packaging may be relatively costly. One such preview process includes physically printing a single copy of the packaging and shrinking it around an actual solid object, or prototype thereof, in a real shrink tunnel or by applying heat in another way.

There is a need in the art for a method that provides for previewing press-ready graphics rendered on the final 3D shape of the shrunk sleeve, e.g., to communicate intermediate results for discussion or approval.

Furthermore, there is a need in the art for a method and apparatus that can aid a designer in seeing where in an area to be printed there is likely to be deformation.

SUMMARY

Presented herein are a method, an apparatus, and a carrier medium carrying code to instruct a processor to execute a method to aid designing flexible packaging for wrapping around a solid object and finalizing the packaging. The method includes accepting a model of the surface of a sheet of packaging material after wrapping around the solid object and finalizing, the model sufficient to map points in the 2D plane of the sheet of the packaging material to the corresponding points in the 3D surface of the wrapped and finalized packaging. The method further includes at least one of displaying the surface of the wrapped and finalized packaging; displaying graphic elements on the surface of wrapped and finalized packaging; generating press-ready graphics for printing onto the surface of the sheet of packaging material; and pre-distorting graphics to correct for any distortions to graphics that occurs during the wrapping and finalizing process, and generating press-ready graphics from the pre-distorted graphics for printing onto the surface of the sheet of packaging material.

Other features and aspects will become evident from the description herein, including the drawings, and the claims.

BRIEF DESCRIPTION OF THE DRAWINGS

FIG. 12C shows an actual screen shot of a 2D view of the foldout sheet and an actual screen shot of a screen for a 3D perspective view of the shrunk sleeve, with the graphics rendered onto the surface with no pre-distortion, while

DETAILED DESCRIPTION

Presented herein is a method, apparatus, and carrier medium carrying code to instruct a processor to execute a method. The method helps a designer of flexible packaging design such packaging, including placing graphics on the packaging.

Terminology

The following terminology used herein is related to the process of producing the shrink packaging, and related to the mathematical description of some of the operations presented herein. As already described above, the order of the cutting, seaming, and wrapping over the solid object may be, and typically is different in an actual production system from that shown in FIG. 1. The meaning of other terms will be clear to those in the art from the usage and/or definitions provided herein, and/or from common usage in the art. See FIG. 1 for illustration of the meaning of some of the terms.

Furthermore, while the description herein is described in terms of shrink packaging, embodiments of the invention are also applicable to the case of designing flexible packaging of other kind. In the definition below, the equivalent terms for the general flexible packaging case will also be provided in some cases.

Figure 1:
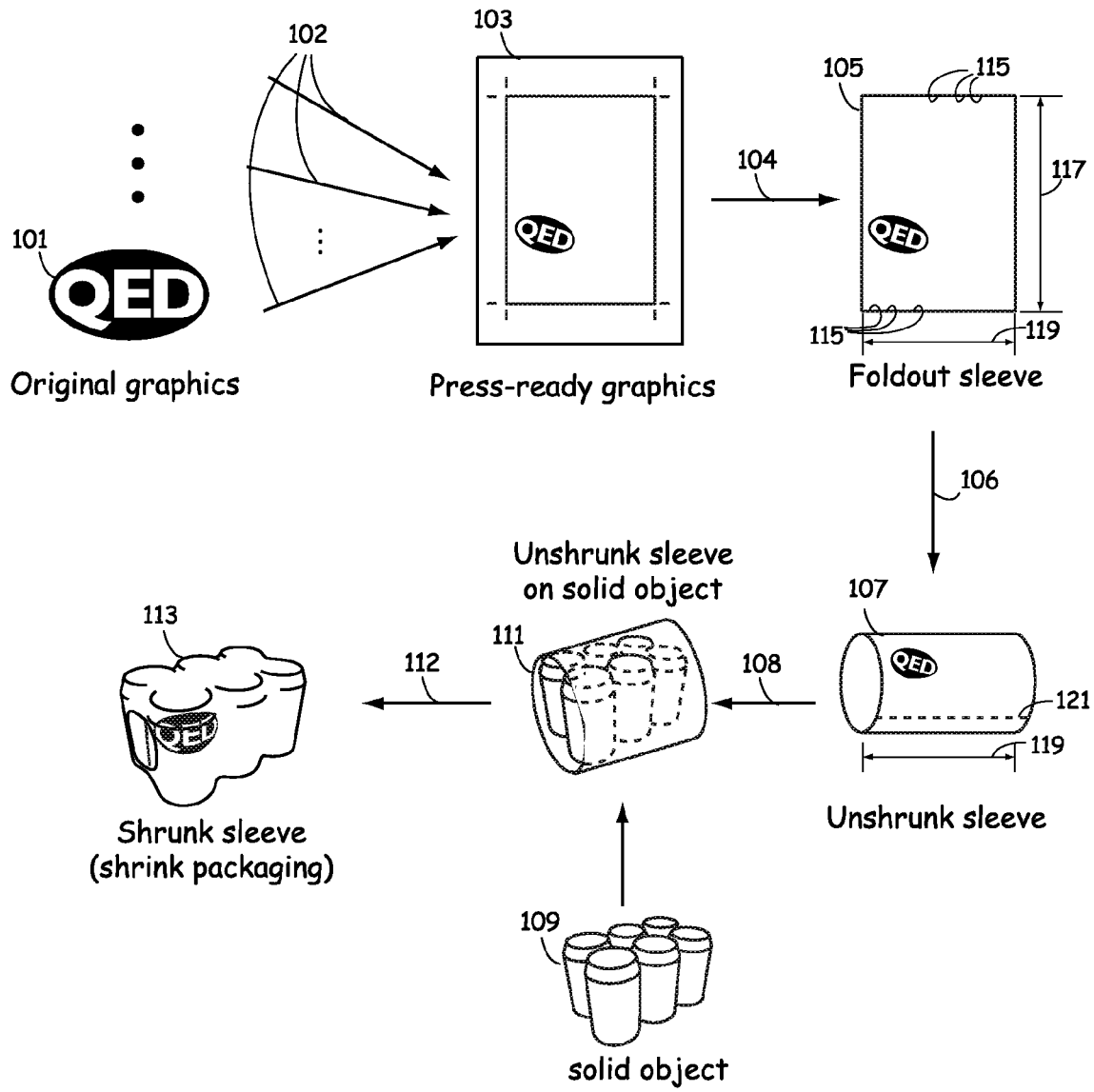
FIG. 1 shows a typical workflow of producing shrink packaging.

Solid object: The object that the sleeve is being shrunk around, e.g., a bottle, a can, a food item such as a turkey, and so forth. The solid object may itself be made up of several objects, e.g., six cans, a tray with bottles, a bottle and a glass, and so forth. In the example of FIG. 1, the rigid body 109 is a set of six drink cans arranged in two rows of three, as in what is commonly called a "six-pack." In the case of flexible packaging in general, the solid object is the object around which the packaging is to be placed, e.g., stretched or wrapped.

Foldout sleeve: After the sleeve has been printed, it is typically in the form of a rectangular sheet. Two edges that are to be joined are called the seam edges, also seam lines. The foldout sleeve is joined at the seam edges to form a seam, and the foldout sleeve thus forms a generalized cylinder. The generalized cylinder is placed over the solid object and then the sleeve is shrunk around the solid object. In FIG. 1, the foldout sleeve is shown as sleeve 105. While in the general case of non-shrink wrap flexible packaging, the material may not first be formed into a general cylinder, the material does typically start out as a flexible sheet, and the term foldout sheet will be used for such a sheet for the non-shrink packaging case as well.

Seam lines: Also called seam edges, these are the two opposite edges of the foldout sleeve rectangle that are joined to make a (generalized) cylinder. In FIG. 1, the seam lines are shown by reference numeral 115 in the foldout sleeve 105. In an actual production system, the sleeve is typically joined by forming a strip of overlapping material. The methods described herein ignore the strip of fold-out sleeve that will be covered by another strip of fold-out sleeve. How to modify the methods described herein to take the overlap into account would be straightforward to those in the art.

Unshrunk sleeve: This is the generalized cylinder prior to shrinking, and typically includes a seam where the seam ends of the foldout sleeve are joined. An unshrunk sleeve 107 is shown in FIG. 1, where the seam is shown by a dashed line as seam 121. In the general case of non-shrink wrap flexible packaging, the unshrunk sleeve refers to the material around the solid object prior to finalizing, e.g., stretching or wrapping and sealing.

Sleeve length: The length of the seam on a sleeve, before shrinking. In FIG. 1, the sleeve length dimension is shown by reference numeral 119 in the foldout sleeve 105 and unshrunk sleeve 107.

Sleeve circumference: The other dimension of the foldout sleeve, which is the same as the circumference of the generalized cylinder of the unshrunk sleeve. In FIG. 1, the sleeve circumference dimension is shown by reference numeral 117 in the foldout sleeve 105.

Shrunk sleeve: Unless stated otherwise, in most cases this means the virtual or physical sleeve in its final shrunk shape around the object. The shrunk sleeve is therefore the shrink sleeve after the shrinking process. By virtual is meant the computer representation of the physical sleeve, e.g., as a 3D surface model. Another term for the shrunk sleeve is post-shrinking shrink packaging, and yet another is post-shrinking shrink-sleeve packaging. A shrunk sleeve 113 is shown in FIG. 1. Note that in the general case of flexible but non-shrink packaging, the term used to refer to the 3D shape of the material around the solid object is "finalized packaging." Its shape is referred to as the "final packaging shape" and also as the "finalized packaging shape" herein.

Original graphics: The graphics that are to be placed on the foldout sleeve. In one embodiment, the original graphics are provided in a 2D graphics file, and are designed to look good on a flat surface. Original graphics 101 is shown in FIG. 1

Press-ready graphics: The original graphics after placement and positioning on a 2D planar surface, and if necessary, pre-distorted so that after printing, cutting, joining at the seam edges, and shrinking onto the solid object, the graphics appear as intended. Note that in general, only geometric pre-distortion is included. Those in the art will understand that color separation, trapping and one or more other pre-press operations may also be necessary. In the example of FIG. 1, the press-ready graphics is shown as press-ready graphics 103.

Note that distortion can occur in the finalizing process for flexible packaging that is not shrink packaging, e.g., packaging that is stretched around a solid object.

Generalized cylinder: This is a 3D surface that can be described by drawing parallel lines through every point of a 3D curve. See Eric W. Weisstein. "Generalized Cylinder," from *MathWorld*—A Wolfram Web Resource, mathworld~dot~wolfram~dot~com/ GeneralizedCylinder~dot~html, where ~dot~ denotes a period character in the actual URL. In general, this is a tubular surface whose transverse cross-section need not be circular, and whose longitudinal axis need not be a straight line.

Shrink tunnel: The environment and process that a sleeve is put through after being placed over the solid object to shrink the packaging material around the solid object. Although using today's technology, a shrink tunnel applies heat in one or more ways to achieve the shrinking, the present application is applicable to other shrinking processes as well. The shrink tunnel is also referred to as the shrinking process herein, and is shown as process 112 in the example of FIG. 1. In the non-shrink-packaging case, the analogous process is called finalizing.

Distorted: Graphics are considered to be distorted by a given mapping if the mapping distorts a shape, e.g., so that length or angles or both are not preserved. Therefore, by distortion is meant a geometric distortion Normalized parametric equation: Parametric equation of a curve, denoted c(p), where p is a parameter that describes the length of the curve measured from point c(0) to point c(p).

Texture Mapping: A 3D rendering technique that, usually, is computationally more efficient than full shading. In one version, this is a rendering method that pastes an image onto part of a 3D image, e.g., draws a pixel buffer on top of a polygon in 3D. See, for example, J. D. Foley, A. van Dam, S. K. Feiner, and J. F. Hughes, "Computer graphics: principles and practice, 2nd Edition" Addison-Wesley, 1990, also, J. D. Foley, A. van Dam, S. K. Feiner, and J. F. Hughes, "Computer graphics: principles and practice in C, 2nd Edition" Addison-Wesley, 1995.

Offset: The offset of a convex closed curve is the convex closed curve that lies at a constant given distance outside of the first curve. Off-setting a convex curve with a distance d, will make the curve 2πd longer.

Ray: A ray is parametric description of a semi-line in 3D ($x$_vector=start_vector+$p$*direction_vector with $p$>=0).

The "first" intersection of a ray with an object is the intersection-point of the semi-line with the object that has the lowest p-value.

Figure 2:
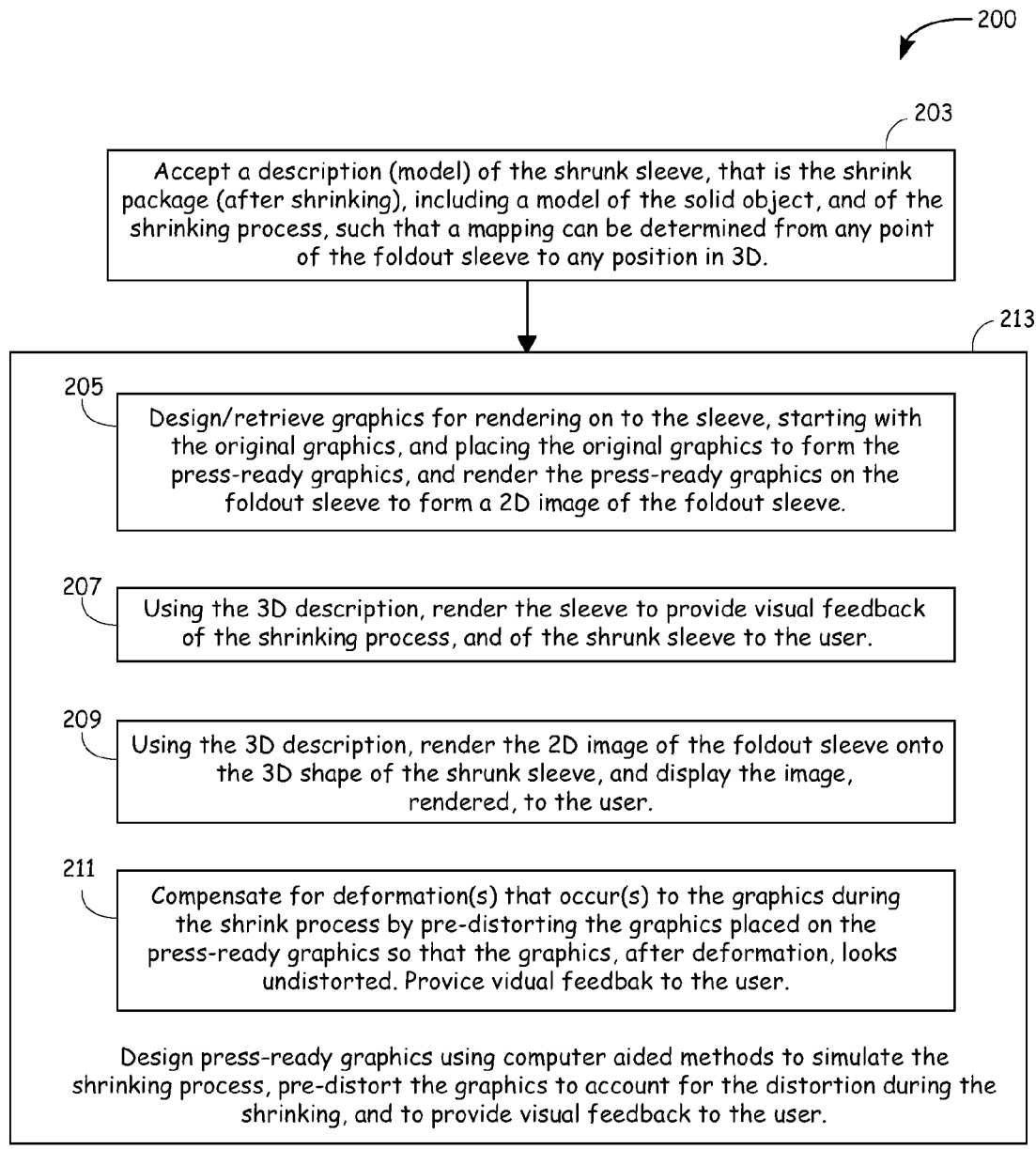
FIG. 2 shows a flowchart of one method embodiment of the invention.

FIG. 2 shows a flowchart of a shrink-packaging method embodiment 200 of the invention. Using the method 200, two-dimensional graphics, e.g., press-ready graphics can be accurately created for printing on a substrate that forms a foldout sleeve 105. The method 200 includes providing a user with visual feedback of one or more of the shrinking process steps—in general, the finalizing process, the shrunk sleeve 113—in general, the pre-finalizing packaging—for a particular solid object 109, and the appearance of graphics on the shrunk sleeve 113. The method further provides for determining the distortion that occurs to any graphics during the shrinking process 112, and further provides for pre-distorting graphics to compensate for the distortion that occurs during the shrinking or other finalizing process, so that the graphics, after the distortion, appear correct. Visual feedback is provided to the user of the possibly pre-distorted graphics, after the distortion, on the shrunk sleeve.

Figure 3:
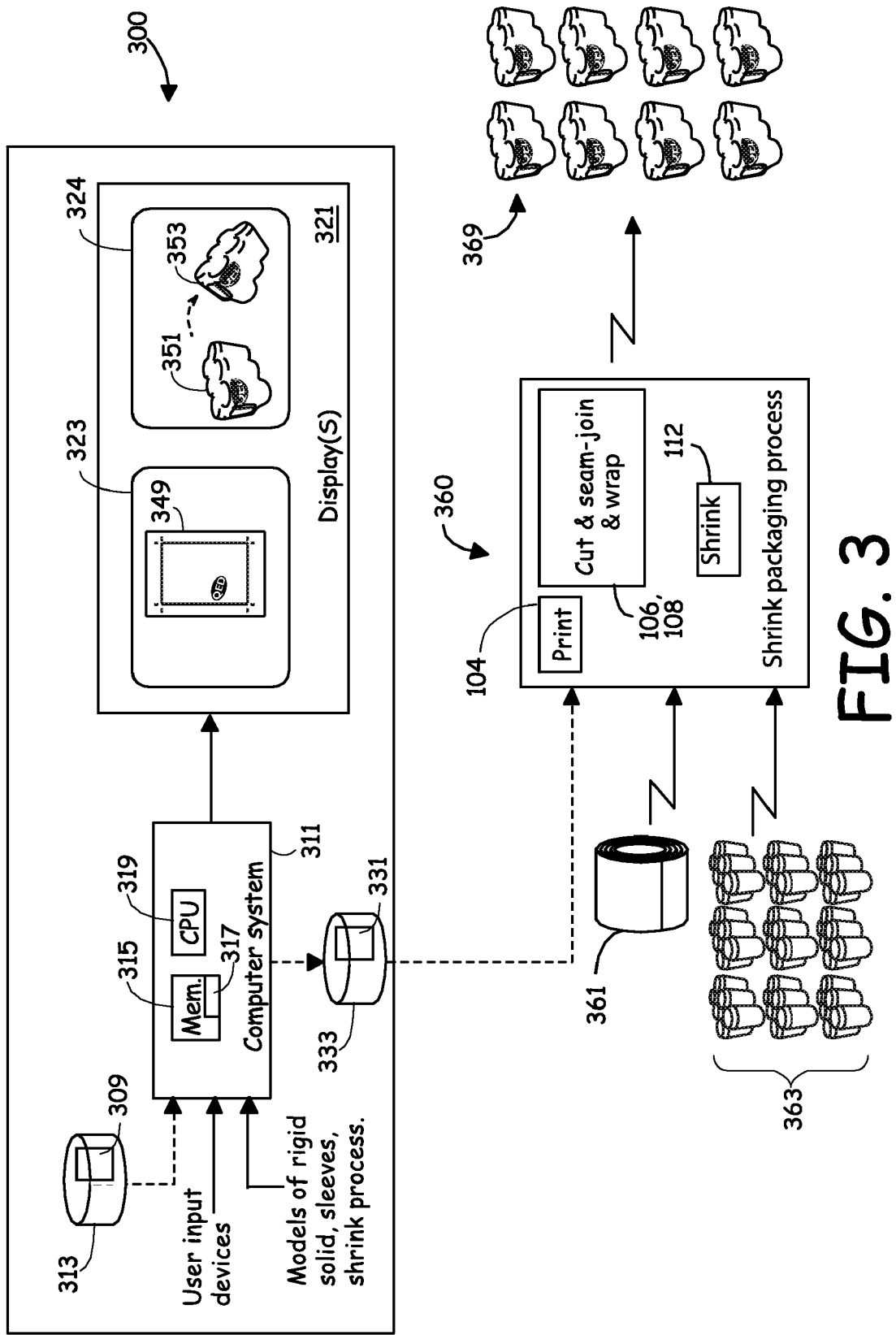
FIG. 3 depicts system components, including a computer system that can be used to carry out one or more method embodiments of the present invention, e.g., the method 200 of the flow chart of FIG. 2.

The method of FIG. 2 is implemented on a processing system, e.g., a computer system. FIG. 3 depicts system components, including a computer system that can be used to carry out one or more method embodiments of the present invention, e.g., the method 200 of the flow chart of FIG. 2. FIG. 3 shows a graphics creation system 300 that includes a computer system 311 that has a CPU 319 and a memory 315 that typically includes persistent and non-persistent memory. Stored or loadable into memory 315 are software instructions 317 of a software program 309 that when executed by CPU 319 will cause a method embodiment of the present invention to be carried out. As indicated in FIG. 3, in some systems, the complete set of programming instructions of the program 309 that when executed implements the method may be stored on a storage medium 313, such as optical or magnetic storage, to be read into computer system 311. Those skilled in the art will recognize the storage media 313 may in fact be part of the computer system, or may be physically remote from computer system 311, and may, if desired, be accessed over a communications link such as the Internet, a network, etc.

Computer system 311 receives as input a description of the shrunk sleeve, i.e., of shrink package (after shrinking), or, the general flexible packaging case, of the finalized packaging. The description, for example, is in the form of a model.

In a first embodiment, the description includes a description, e.g., a model of the solid object 109 on which the unshrunk sleeve is to be shrunk, a model of the foldout sleeve material, and a simulation model of the shrinking process 112. This information may be in a file on storage 313, or may be manually input by the user, or may be provided to the computer system in some other way, e.g., as one or more files from a CAD system.

In a second embodiment, the description includes measurements on a prototype that provide for a mapping from 2D coordinates on the foldout sheet to 3D coordinates on the surface of the shrunk sleeve.

Note that in general, the shape is a complex shape. Systems are known for displaying solid surfaces with graphics deformed to be around the surface for some simple shapes, e.g., a shape that is circularly symmetric around an axis. By a circularly symmetric shape is included any shape that can be formed by rotating a line around an axis of rotation that does not intersect the axis of rotation. Embodiments of the invention work with any shapes, e.g., shapes that are not circularly symmetric.

As CPU 319 executes instructions of the program 309, the graphics artist can create and then lay out the various original graphic elements 101, e.g., images and/or text for the sleeve. Commercially available graphic design software is known in the art, and may be used as part of program 309 at this juncture. Alternatively, dedicated code may be included in software 309 for this task. Exemplary commercially available software includes PackEdge, manufactured by Esko-Graphics located in Gent, Belgium, and a subsidiary of the assignee of the present invention.

Typically the graphics artist will use one or more input devices such as a mouse, a trackball, a joystick, a digitizer tablet, and even a computer keyboard to create such images, and/or to load images from memory 315. Alternatively, the graphics 103 may already be available as files in storage 313, or otherwise be available.

The computer system includes a display subsystem 321 that includes one or more display screens. Two screens are shown in FIG. 3, and those in the art will understand that in alternate versions, the contents of the two screens 323, 324 may be shown as two windows in a single screen. The graphics artist can view on display screens 323, 324 views of the sleeve packing being designed. In the example shown in FIG. 3, shown in screen 323 is a 2D view 349 of the sleeve, in this case, the foldout sleeve 105, while shown in screen 324 are two 3D shaded views 351, 353 of the shrunk sleeve, as it would appear, and as rendered by the method. The two views represent the ability of the user to manipulate, in this case rotate a rendered 3D image. The displayed images may be manipulated and new images viewed. Program 317 uses the accepted model to simulate the shrinking process and determine the appearance of the shrunk sleeve.

Thus, as described in more detail below, the graphics artist can cause program 317 to create a three-dimensional image of the shrunk sleeve replete with printed graphics. Another operator, whose interest is the shrinking process, can create a three-dimensional image of the shrinking process operating on the unshrunk or partially shrunk sleeve.

In another embodiment, the simulation of the shrinking is used to provide information on the shrinking process to improve the production process, e.g., to influence the choice of sleeve material, set-up (tune) the shrink parameters for the shrinking process, e.g., in the shrinking tunnel, and the positioning of the unshrunk sleeve.

As further described below, the graphics artist can cause program 317 to pre-distort the graphics to compensate for the distortion that occurs during the shrinking or stretching process. The pre-distorting may be automated, or partially automated. By partially automated is meant the case that a pre-distortion function may be generated by the computer, and then modified manually by the user to provide the desired results, or the case that the pre-distortion method uses one or more parameters such that the user can change properties of the pre-distortion by changing one or more of the parameters.

Once the graphics artist is satisfied that the images to be printed on the shrunk sleeve are properly created, program 317 can generate an output graphics file 331 that includes the press-ready graphics, shown here as being stored in a storage subsystem 333 which may, in some embodiments, be the same as storage subsystem 313.

The remaining portion of FIG. 3 will now be described to illustrate the practical use of output graphics file 331 for the case of shrink packaging. A shrink packaging system 360 might essentially follow the workflow of FIG. 1, or a similar workflow, and is depicted in FIG. 3 as receiving data and information (collectively data) that is input from graphics file 331, and further receiving as input raw planar substrate material 361, e.g., in a stack of cut material, or more typically, in a roll of planar material that is to be printed with graphics created according to features of embodiments of the present invention. The shrink packaging system 360 further accepts solid objects 363 (each a solid object 109). The system 360 includes a print process that produces the foldout sleeve 105 using alignment information from the aligning 104, the (cutting and) seam-joining process 106 that produces the unshrunk sleeve 107, the wrapping process 108 that wraps each solid object 109 with an unshrunk sleeve 107, and the shrink tunnel process 112 that shrinks the sleeves on the rigid bodies and forms shrunk sleeves 369 of individual shrunk sleeves 113 covering individual solid objects 109. The shrink packaging system 360 benefits from one or more features of the present invention, but need not be considered part of features of the present invention.

Note that an actual workflow, the order of printing, cutting, seaming, and forming into cylinders may be different than that shown in either of FIG. 1 or 3. For example, the printing usually occurs on a rotary press, and the cutting usually occurs after the seaming.

In practice, shrink packaging system 360 may include other sub-systems and the various sub-systems may be located remotely from each other. For example in some applications it may be advantageous to print and seam joining planar substrate material 361 at one facility, and to then ship the printed planar substrates to another facility, perhaps a great distance away, for wrapping, and shrinking. Economics and equipment available at a given fabrication site may govern the choice of various possible implementations of shrink packaging system 360.

Returning again to the flow chart of FIG. 2, the method 200 includes in 203 accepting a description of the shrunk sleeve, i.e., of the shrink package (after shrinking). The description, for example, is in the form of a model that provides a mapping from 2D coordinates of points on the foldout sleeve 105 to the corresponding 3D coordinates on the surface of the shrunk sleeve. In one version, the description includes a model of the solid object, and a model of the shrinking process 112.

In 213, the user designs the press-ready graphics 103 using computer aided methods (elements of 213) to simulate the shrinking process, to pre-distort the graphics to account for distortion during the shrinking process, and to provide visual feedback to the user.

The elements of 213 are applied repeatedly as an interactive process until a satisfactory result in the form of press-ready graphics 103 that forms a satisfactory shrunk sleeve package, based on visual feedback, is obtained.

The elements of 213 include in 205 retrieving or designing the graphics and placing the graphics onto the foldout sleeve, starting with the original graphics 101, placing the original graphics to form the press-ready graphics 103, and rendering the press-ready graphics on the foldout sleeve to form a 2D image of the foldout sleeve 105. The graphics may already exist, e.g., in the form of graphic files, or a graphics artist may create the graphics, e.g., on the system 300.

The elements of 213 further include in 207 using the 3D description provided in 203 to render the 2D image of the foldout sleeve onto the 3D shape of the shrunk sleeve, and displaying the image of the shrunk sleeve with graphics, rendered, to the user.

The elements of 213 further include in 209 using the 3D description provided in 203, to provide visual feedback to the user of the shrinking process, e.g., as indication on the 2D foldout sheet, and visual feedback to the user of the shape of the shrunk sleeve. This feedback can be used, e.g., to modify the description of the shrinking process, or to indicate to a graphic designed where there may be excess shrinkage, and hence excess distortion.

The elements of 213 include in 211, compensating for deformation(s) that occur(s) to the graphics during the shrinking process by pre-distorting the graphics placed on the press-ready graphics so that the graphics, after deformation, look undistorted. In one embodiment, to compensate by pre-distorting uses the description of the shrinking process, and includes providing visual feedback to the user.

Coordinates

Figure 4:
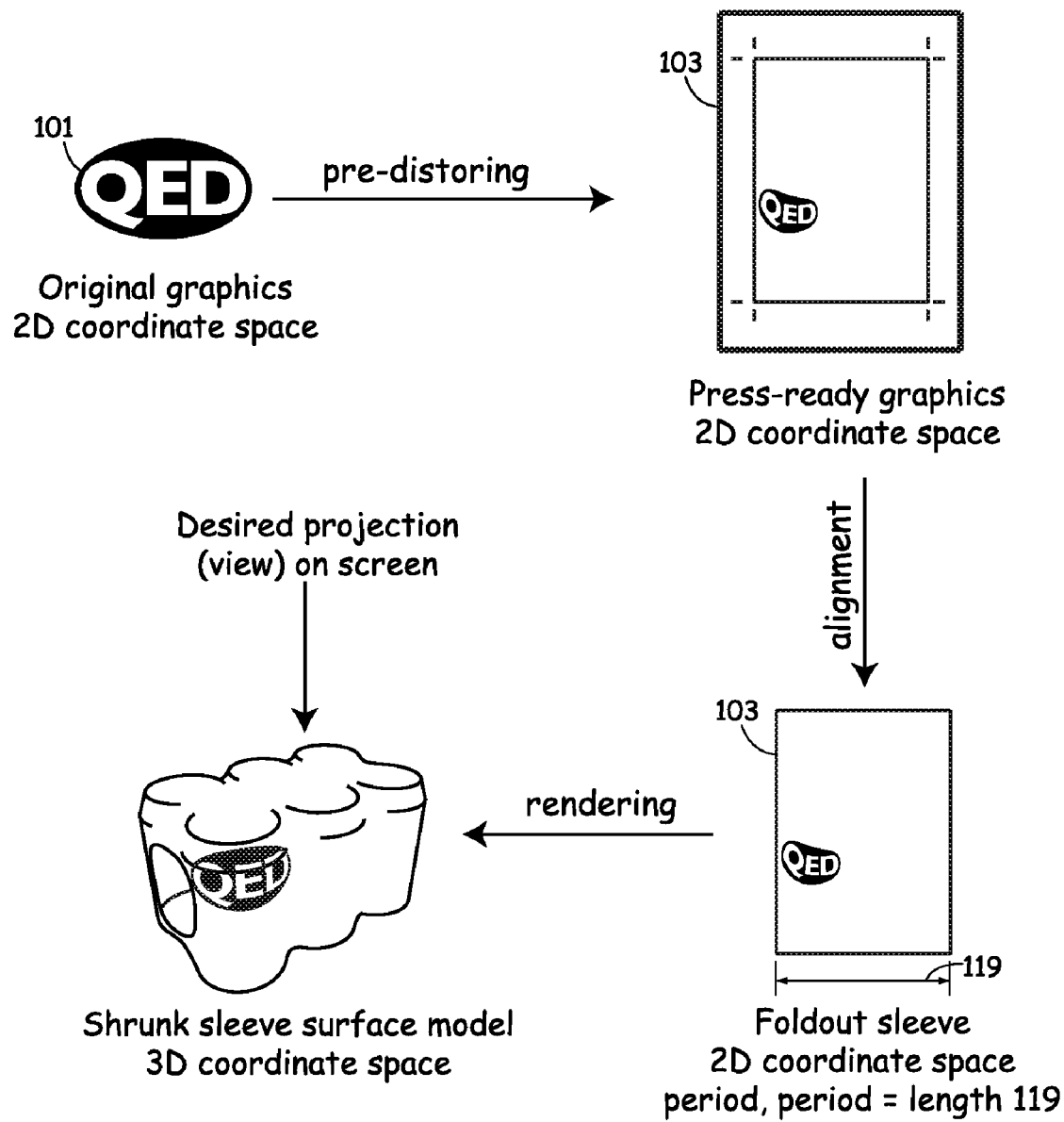
FIG. 4 shows some of the coordinate systems described herein.

FIG. 4 shows some of the coordinate systems described herein. While 3D coordinates are used for the solid object and the shrunk sleeve, some embodiments of the invention includes rendering and manipulation of 3D objects on a 2D display screen. The method accepts a desired projection, i.e., view to carry out the rendering. The user inputs such desired projection by use of interaction devices such as mouse.

Note that the 2D coordinate in the longitudinal direction in a 2D coordinate system of the foldout sheet, shown in FIG. 4 as the horizontal direction, is periodic.

Accepting a Model for (Producing) the Shrunk Sleeve

The goal of block 203 in the method 200 is to provide the method 200 with a description, e.g., as a model, of the shrunk sleeve after shrinking, including models of the unshrunk sleeve, the solid object, and the shrinking process. The model is arranged to describe the 3D shape of the surface and in one embodiment, to describe how graphics, printed on the unshrunk sleeve will be distorted. In general, the model includes sufficient information to map any point on the foldout sleeve 105 to a position in 3D, e.g., on the shrunk sleeve.

A Model Obtained by Numeric Simulation of the Shrinking Process.

A first embodiment includes providing a 3D model of the solid object, determining the initial position and shape of the unshrunk sleeve, and simulating the shrinking process to produce a mapping from the 2D coordinate space of the foldout sheet to the 3D coordinates of the surface of the (simulated) shrunk sleeve. For the case of non-shrink packaging, an analogous embodiment includes providing a 3D model of the solid object, determining the initial position and shape of the pre-finalized packaging, and simulating the finalizing process for the flexible packaging to produce the mapping from the 2D coordinate space of the foldout sheet to the 3D coordinates of the surface of a (simulated) finalized package.

Figure 5:
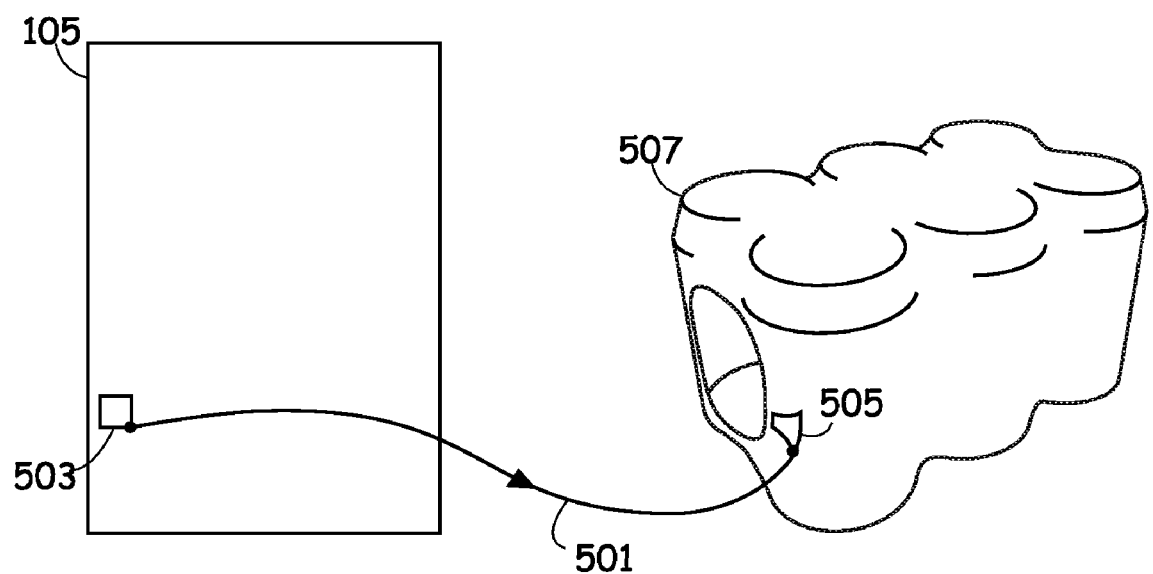
FIG. 5 illustrates a mapping of a 2D rectangle on the 2D foldout sleeve to a curved surface in 3D on the surface of the shrunk sleeve.

In one embodiment, the sleeve model is a parametrical function that maps a 2D rectangle on the 2D foldout sleeve to a curved surface in 3D on the surface of the shrunk sleeve. FIG. 5 illustrates such a mapping 501, in this case applied to a 2D rectangle 503 on the foldout sleeve 105 to a curved surface 505 on the surface model 507 of the shrunk sleeve 113.

Providing a 3D Model of the Solid Object

It is desirable that the sleeve model produces results that match the shape and graphic deformation of an actual shrink-wrap sleeve and shrinking process thereon. To achieve this includes simulating the shrinking process around a provided solid shape of a solid object 109. Such simulating includes, in block 203, the user providing and the method accepting a 3D description of the shape of the solid object 109.

In one embodiment, the 3D description of the solid object 109 is provided as data from an application program called ARTIOSCAD™ from Esko-Graphics NV, of Gent, Belgium, a subsidiary of the assignee of the present invention. ARTIOSCAD is a CAD and package design system especially configured for packaging design that provides for a user to design a package geometry. Alternately, the 3D description of the shape of the solid object can be provided from any CAD or solid modeling program or any suitable file format for such a description. Such an alternate file format can use any type of geometric description, as long as it allows basic operations like intersecting it with a line segment. One embodiment provides for accepting a model of the shape of the solid object that includes triangular meshes of triangular surfaces to describe the shape. File formats accepted include one or more of the commonly used and/or industry standard 3D formats, including IGES, STEP, CATIA, and PRO ENGINEER™.

In another embodiment, the 3D description of the solid object is provided by a 3D scanning device, also called a 3D digitizer. Such 3D scanning devices can measure a physical object and generate a corresponding 3D description.

One embodiment further provides for the design to be manually input, or designed in the graphics creation system 300 of the 3D solid object 109.

In the example illustrated herein, the solid object 109 is a group of 6 soda cans.

Determining the Initial Position of and Shape of the Unshrunk Sleeve

In addition to the method embodiment accepting the description of the solid model, accepting the description includes determining the initial position and shape of the unshrunk sleeve 107. The purpose is to provide for the method how the sleeve looks, relative to the solid object, before entering the shrink tunnel for the shrinking process 112.

In one embodiment, applicable, e.g., for a simple shape, the initial position and shape of the unshrunk sleeve is specified by the user of the graphics creation system 300. The user chooses a relatively simple shape, such as a cylinder, and provides for the method the sleeve length and circumference. The method, in the form of program 317, includes providing a rendered image in 3D of the sleeve, e.g., on the screen 324. Using the user input devices, the user manipulates, e.g., rotates and translates the cylinder until a desired position and shape around a rendered image of the solid object is obtained. As an alternate, or in addition to the interactive manipulation using visual feedback, the user is able to rotate and/or translate the shape numerically by specifying translations and/or rotations.

In one embodiment, the cylinder is represented in the code 317 by a parametric representation. A parametric representation of a cylinder provides for ease of mapping any point in the foldout sleeve to its corresponding position on the cylinder, as is required to render and display any graphics in the foldout sleeve 105. If circumference and length match, the graphics will not be distorted by this mapping.

In one embodiment, applicable, for example, for a solid object 109 of more complex shapes, the description of the solid object is used as input to a method of determining, e.g., by calculation, a sleeve that appears as if the shape been wrapped around the solid object 109.

The following method determines a generalized cylinder around the solid object 109.

Figure 6:
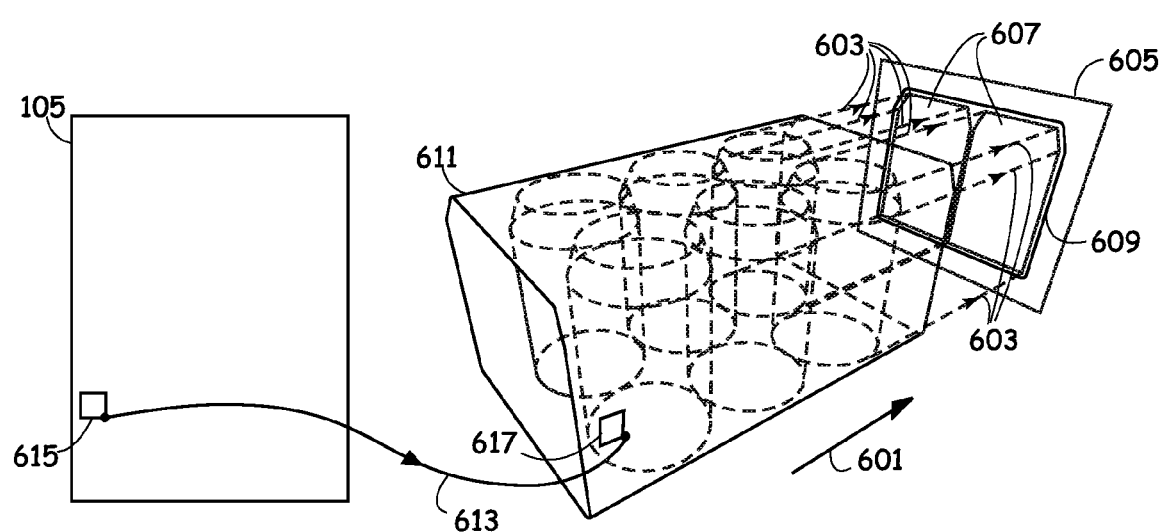
FIG. 6 shows the solid object 109 wrapped by the generalized cylinder to be determined, and some projection lines 603 parallel to the selected direction shown by arrow 601, that project the solid object as projection 607 on the plane 605 perpendicular to the selected direction 601.

1. A user selects a direction for the display of the object. For the user-selected direction, the method projects the solid object along the user-selected direction onto a plane perpendicular to that direction. FIG. 6 shows the solid object 109 wrapped by the generalized cylinder (to be determined), and some projection lines 603 parallel to the selected direction shown by arrow 601, that project the solid object as projection 607 on the plane 605 perpendicular to the selected direction 601.
2. In that projection plane 605, construct a non-intersecting closed curve 609 around the projection 607 of the solid object. In one embodiment, the non-intersecting closed curve is the convex hull (not shown in FIG. 6), and it follows the shape of the two can projections 607, but convex. In another embodiment, in the case that the sleeve circumference 117 is known and is larger than the length of the perimeter of the convex hull, the method applies an appropriate offset to the convex hull to produce a curve that has the same shape as the complex hull, with a perimeter length the same as the circumference 117. Such a curve is shown as curve 609 in FIG. 6.
3. Create a generalized cylinder in the selected direction 601 with the closed curve 609 as the transverse cross-section.
4. Limit the generalized cylinder by two planes that are parallel to the projection plane, so that the generalized cylinder 611 representing a view of the unshrunk sleeve 111 has the length 119, and so that the solid object 109 is adequately covered.

In one embodiment, the closed curve is represented by a normalized parametric equation. Determination of a parametric equation for the sleeve is then straightforward, as would be known to those in the art.

Furthermore, if the length of the perimeter of the closed curve 609 matches the sleeve circumference 117, and the distance between both capping planes matches the sleeve length 119, then this parametric equation describes a mapping, shown as mapping 613, of the foldout sleeve 105 to the 3D surface 611 without any graphic distortions. A rectangle 615, for example, would map to an undistorted rectangle 617 on the surface 611.

Thus, in one embodiment, a parametric representation of the surface of the unshrunk sleeve is available that provides for a mapping of any point in the 2D space of the foldout sleeve to a point on the surface of the unshrunk sleeve.

The sleeve surface may now be displayed as a 2D perspective view in any direction on the screen 349.

Simulating the Shrinking Process

Another aspect of the accepting of the description, e.g., a model of the shrunken sleeve, is providing a description, e.g., a model of the shrinking process, so that the effects of shrinking can be predicted, e.g., for purposes of display. This includes providing a simulation model of the shrinking process 112.

Figure 7:
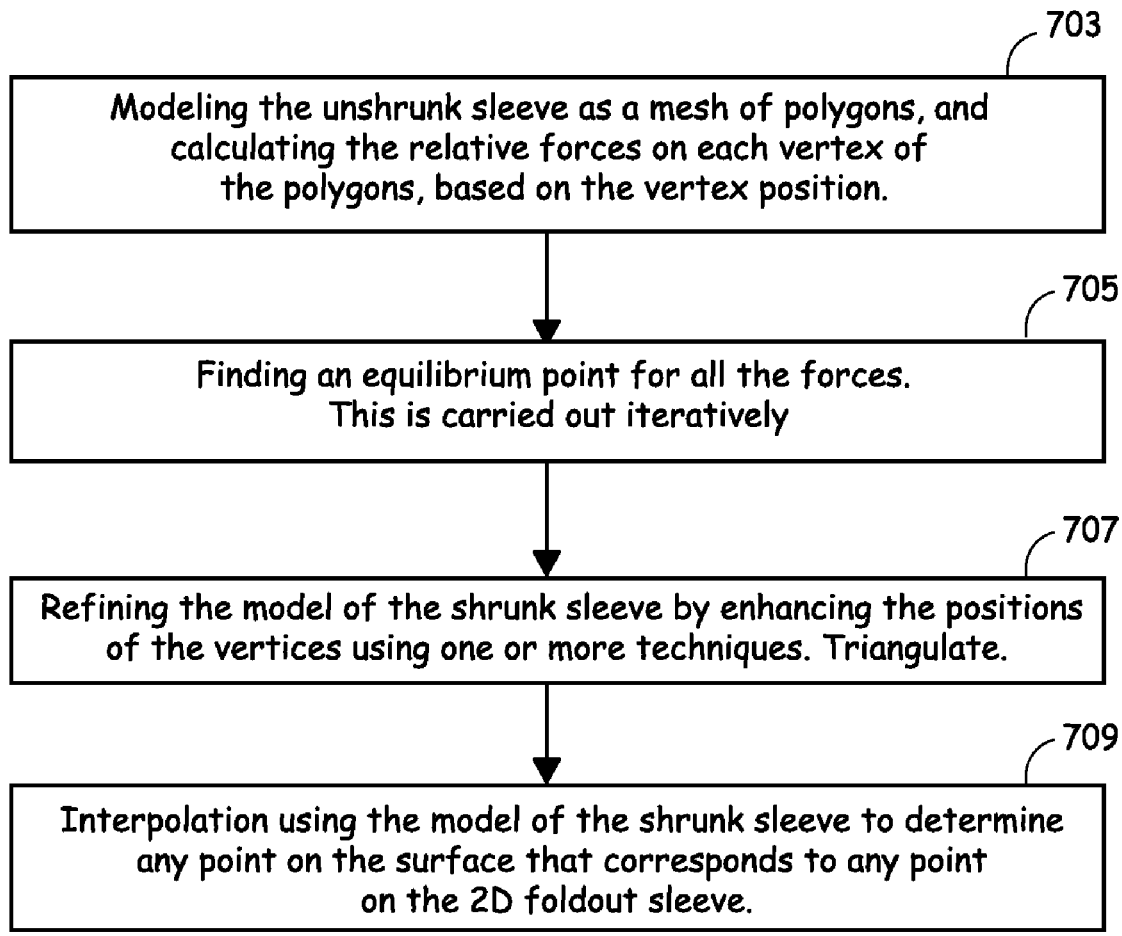
FIG. 7 shows a flow chart of one embodiment of a method 700 of simulating the shrinking process.

FIG. 7 shows a flow chart of one embodiment of a method 700 of simulating the shrinking process. The method 700 includes:

In 703, representing the unshrunk sleeve as a set of discrete elements. In one embodiment, this includes modeling the unshrunk sleeve as a mesh of polygons, and calculating the relative forces on each vertex of the polygons, based on the vertex position. The forces are calculated based on the properties of the material, and further, based on shrinking (or stretching) the material, e.g., using heat.

In 705, finding an equilibrium point for all the forces by moving the vertices. This is carried out iteratively. At each iteration, each vertex is moved in the direction of its force. The iterations are repeated until equilibrium is reached or a termination condition is reached. The moving of the vertices is constrained by the model of the 3D solid to be wrapped.

In 707, the model of the shrunk sleeve is refined. It has been found that the result of the process of finding the force equilibrium does not, in itself, usually produce enough accuracy. Therefore, in one embodiment, the positions of the vertices are enhanced by one or more techniques and/or more vertices are added. The final stage of the refining triangulates the polygons so that the shrunk sleeve surface is modeled by a set of triangular surfaces.

In 709, interpolation is used on the model of the shrunk sleeve. Once the shrunk sleeve has been modeled as a triangular mesh, interpolation is used to determine any point on the surface that corresponds to any point on the 2D foldout sleeve.

Some of these features of simulating the shrinking process are now discussed in more detail.

Figure 8:
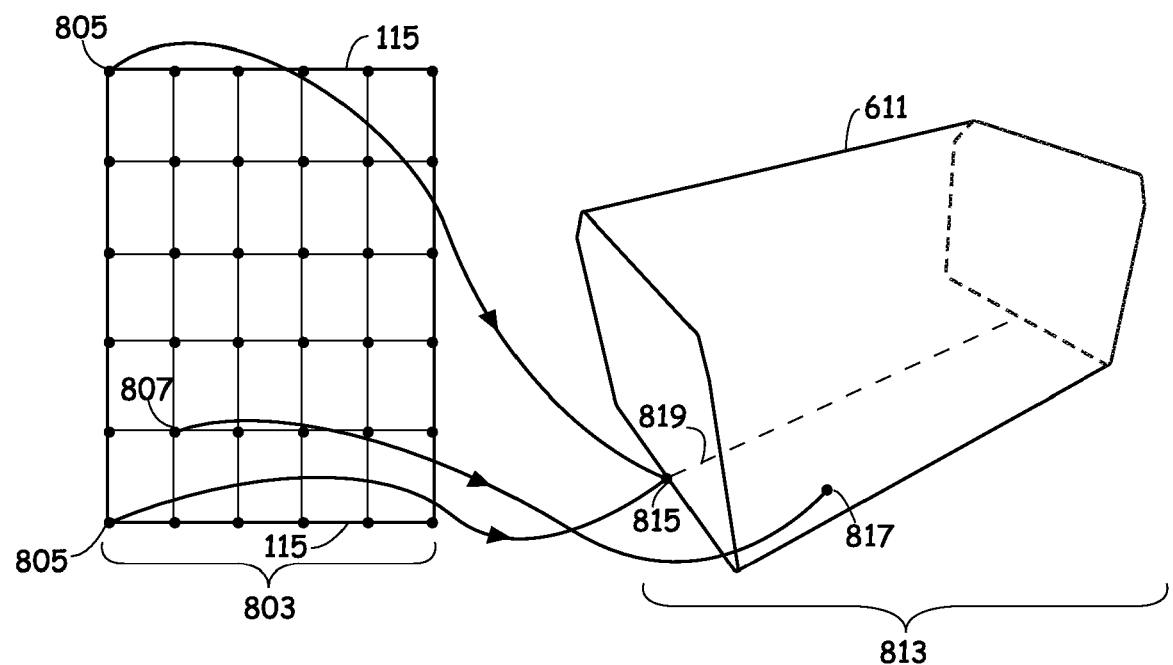
FIG. 8 shows the foldout sleeve with the vertices of a mesh of rectangles 803 defined on the 2D plane.

Block 703 includes modeling the unshrunk sleeve as a mesh of polygons. In one embodiment, the mesh of polygons is based on a parametric representation of the surface of the unshrunk sleeve accepted in 203 (FIG. 2) that provides for a mapping of any point in the 2D space of the foldout sleeve to a point on the surface of the unshrunk sleeve. FIG. 8 shows the foldout sleeve with the vertices of a mesh of rectangles 803 defined on the 2D plane. The seam edges 115 are mapped to a line 819 in the surface 611, corresponding to the seam line 121 in the unshrunk sleeve 107.

By the mapping from the 2D plane to the surface model 611 of the unshrunk sleeve, a mesh of polygons 813 is thus defined on the surface 611. Each vertex in 2D polygon mesh 803 has a corresponding vertex in the mesh 813 on the surface. In one embodiment, the vertices are stored in a data structure, e.g., in the memory 315 of computer system 311. In one embodiment, the data structure stores for each vertex the vertex's position in 3D on surface 611, as well as the vertex's 2D position in the 2D coordinate system of the foldout sleeve. For example, the two vertices 805 in the mesh 803 both map onto the vertex 815 of 3D mesh 813. The vertex 807 in the 2D mesh 803 maps to vertex 817 in the 3D mesh 813. The coordinate in the longitudinal direction, shown in FIG. 8 as the vertical direction, is modulo the length 119, so that the two vertices 805 have the same 2D coordinates. Alternately, pairs of 2D coordinates that are on the seam share the same 3D coordinates.

Thus, the storage of these vertices in the 3D mesh 813 includes both their 3D coordinates, e.g., of vertices 817 and 815, and the corresponding 2D coordinates, e.g., 805 and 807, respectively.

Block 703 further includes calculating the relative forces on each vertex of the polygon mesh 813, based on the vertex position in 3D. In one embodiment, each force is a 3D vector whose length is the relative magnitude of the force. The forces are calculated based on the properties of the material, in the form of the material's modulus of elasticity in tension (Young modulus) and the material's relative measure of the simultaneous change in elongation and in cross-sectional area within the elastic range during a tensile or compressive test, e.g., its ratio of lateral strain and axial strain (Poisson's ratio), and further, based on the material's shrinking properties, e.g., using heat.

The method includes the user providing, e.g., in a file, elasticity, shrinking, and anisotropic properties of the material. In one embodiment, the material's Young's modulus, Poisson's ratio, and the shrinking properties are provided.

Figure 9:
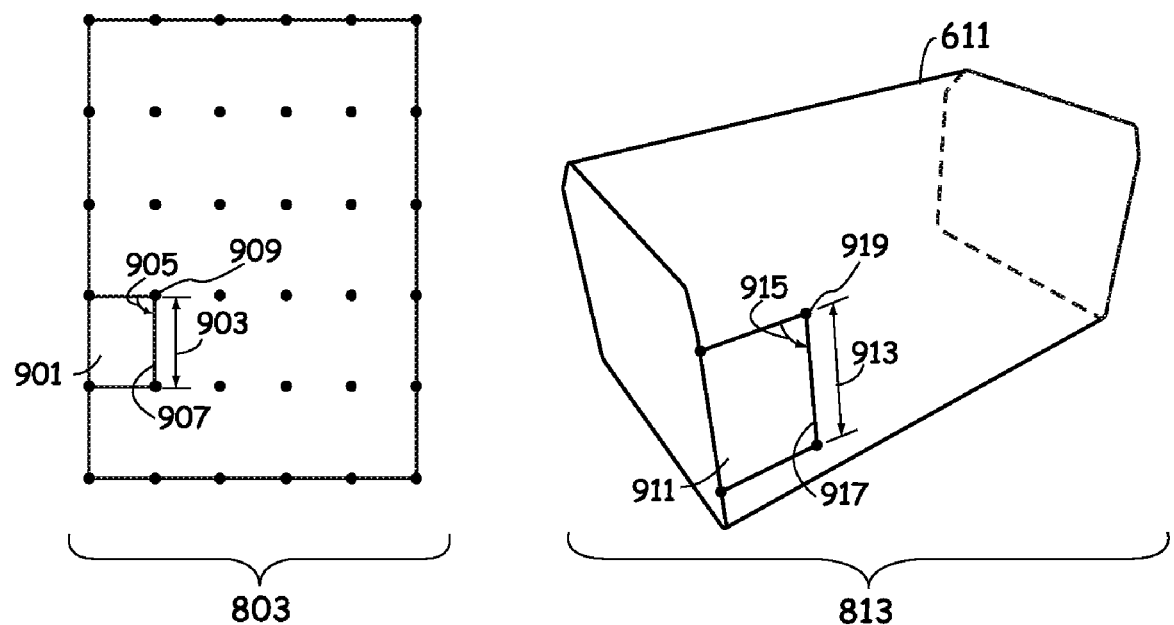
FIG. 9 illustrates some of these calculations of the exemplary surface 611 and 2D and 3D meshes 803 and 813, respectively.

The method uses Hooke's law to determine the relative forces due to elasticity, in particular, stress and shear forces. The determining uses the provided material properties. The force in every vertex is the vector-sum of several stretch and shear forces. FIG. 9 illustrates some of these calculations of the exemplary surface 611 and 2D and 3D meshes 803 and 813, respectively.

Stretch: For each pair of vertices that defines a polygon edge, for example in FIG. 9, for polygon 911 in 3D mapped from polygon 901 in 2D, the pair of vertices (in 2D of edge 907, corresponding to edge 917 in 3D), the distance 913 is calculated in 3D and compared to the corresponding distance 903 in 2D. With Hooke's law the stretch force for both vertices is calculated as two opposite 3D vectors in the direction of the edge.

Shear: For every polygon corner, for example in FIG. 9, for polygon 911 in 3D mapped from polygon 901 in 2D, the 3D angle 915 at vertex 919 between both edges is calculated and compared to the corresponding angle in 2D, e.g., for the polygon 901, the 2D angle 905 at the vertex 909 that maps to vertex 919. Using Hooke's law, the shear force is calculated as a 3D vector for the vertex 919.

Figure 10:
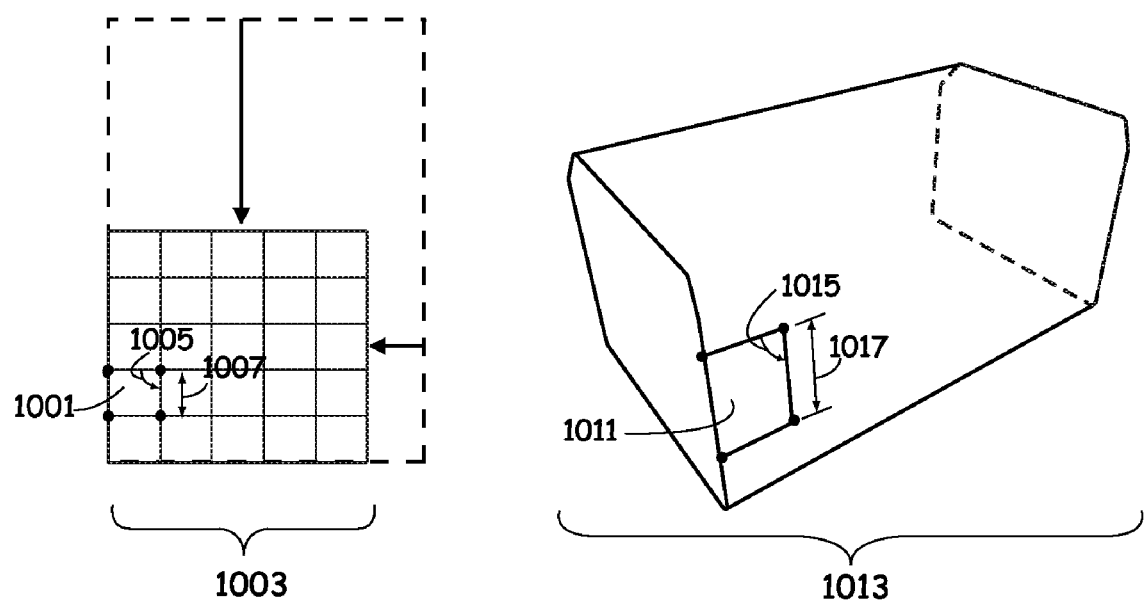
FIG. 10 shows the 2D mesh scaled vertically and horizontally into a new scaled grid 1003.

To simulate the forces that make the sleeve shrink, the method uses the elasticity formulae using Hooke's as described immediately above, but with the rest-lengths and angles changed based on a scaled version of the foldout sleeve. In one embodiment, the user provides a horizontal scale factor and a vertical scale factor to the 2D mesh 803. FIG. 10 shows the 2D mesh scaled vertically and horizontally into a new scaled grid 1003. The polygon 901 in 2D becomes polygon 1001. The length 903 becomes shorted length 1007, and the angle 905 become new angle 1005. As a result, for calculating the forces on the 3D mesh 1013, the new corresponding polygon is 1011. The length of the polygon that was 913 becomes 1017 and the angle 915 becomes angle 1015. While in general different horizontal and vertical scaling factors are used, in one embodiment, the vertical and horizontal scale factors are the same.

Block 705 includes moving the vertices in 3D from the initial locations, according to the force on each vertex until an equilibrium point is found for all the forces, or until some other ending condition is reached, e.g., the vertex reaches a point on the surface of the solid object.

In one embodiment, to find an equilibrium of the forces, each vertex is moved in the direction of its force. Denoting the new position by new_position_vector, the old position by old_position_vector, and the force on the vertex by force_vector, the moving is iterative, according to the following pseudo-code:

Starting with the initial force vectors, and until a termination criterion of a set of iteration criteria is met, repeat 1 and 2:

1. Move the vertices for the force vectors according to:

new_position_vector=old_position_vector+ constant*force_vector, where * is multiplication, and constant some constant.

2. After the vertices are moved, re-calculate the forces.

The method includes detecting collision with the solid object boundary, and not allowing movement beyond the solid object boundary. When each vertex is moved, the method includes testing the line segment of the vertex's original and new position for intersection(s) with the solid object 109's surface. If an intersection is detected, the vertex is moved to the first intersection-point. In one embodiment, the data structure used to maintain vertices includes an indication of whether or not the vertex is one that makes contact with the solid object. In the case that an intersection is detected, the vertex data structure is marked to indicate a contact-vertex.

In one embodiment, contact vertices are not moved in the iterations that follow.

Another embodiment includes simulating friction between the vertex point and a point on the surface of the solid body 109. In such an embodiment, movement of the contact vertex is permitted, but clearly not into the interior of the solid object, and with a new value for constant that takes into account friction. Each pair of materials for the packaging sleeve and the solid object, respectively, uses a different value of constant that accounts for friction.

In one embodiment, the set of iteration criteria includes one or more of:

An indication by the user that there should be no more movement. The user provides such indication based on visual inspection of the 3D rendering of the shrinking sleeve.

A fixed number of iterations have been carried out.

All vertices have made contact, or when the vertices have moved less than a pre-selected distance.

In some cases, it may be that the iterative method does not reach a static force-equilibrium, but rather is unstable or leads to oscillations in the vertex positions. In an alternate embodiment, to prevent such instability or oscillation, the distance that a vertex can move per iteration is restricted. In another alternate embodiment, each vertex is assigned a damping factor denoted d, with 0<d<1, and d initially 1. In one embodiment the damping factor is adaptive. If a vertex moves in a direction that is very different from the previous iteration, the damping factor is reduced. The damping factor acts as a multiplier to reduce the forces acting on a vertex. Alternately, the movement vector is reduced by multiplying by the damping factor.

After the movement iterations, the model of the shrunk sleeve surface model is in the form of a polygon mesh. The precision may not be sufficient to provide an accurate model of the result of actual shrinking.

In 707, the model of the shrunk sleeve is refined in order to prevent or to minimize visual artifacts in 3D renderings of the shrunk sleeve.

In one embodiment, such refining includes using a finer polygon mesh to start with. However, this has been found to have a large detrimental effect on the performance of the iterative method of simulating shrinking. In a first refinement, polygons are subdivided only in areas of the shrunk sleeve that are very bent. In a first refining method, determining such a region includes calculating and comparing the normals of polygons. After subdivision, one or more rounds of iterations are run to allow the vertices in the finer grid to find an equilibrium.

In a second refining method, which is not mutually exclusive to using the first refining method, in areas of the shrunk sleeve that make full contact with the solid object, the polygon representation of the shrunk sleeve is replaced by the representation of the solid object. This method assumes that the mesh of the representation of the shrunk sleeve surface is coarser than the mesh of a representation of the solid object.

On a third refining method, the polygons of the 3D mesh are subdivided into triangular planes. The third refining method is not mutually exclusive to using the first and/or the second refining method. Typically, the third refining method is always used. This leads to a 3D surface model of a mesh of triangular planes, with a corresponding triangular 2D mesh produced by subdividing the foldout sleeve polygons.

Thus a 3D mesh and the corresponding 2D points are obtained, and provide one form of maintaining the surface model 507 of the shrunk sleeve 113.

In 709, interpolation is used to determine any point on the surface that corresponds to any point on the 2D foldout sleeve. How to interpolate within a mesh of polygons, e.g., triangular planes is well known in the art.

In one alternate embodiment, provision is made for the user to manually fine-tune the shape of the shrunk sleeve to have it better match real-life shrinking.

In another alternate embodiment, the amount of shrinking, e.g., the horizontal and vertical scaling factors, varies across the sleeve to match the different temperatures provided by a shrink tunnel that provides variable temperatures.

In an alternate method, running the model uses a finite element method to find the result of a manufacturing process that shapes a preform that is already carrying graphics, e.g., already printed, the shaping being to a curved surface. The graphics in one embodiment is distorted to account for distortion that occurs in the shaping.

Obtaining the Shrunk Sleeve Model by Measurement

In an alternate embodiment, the shrunk sleeve surface model 507, and the mapping from 2D to the 3D surface coordinates is obtained by means other than numerical simulation, e.g., by measurement. In one version, a prototype foldout sleeve is marked with a rectangular grid, so that there is a set of known 2D coordinates of the vertices. The method includes forming an unshrunk sleeve around a prototype solid object that has the same shape (and other, e.g., thermal properties) as the solid object. The method further includes shrinking the prototype unshrunk sleeve by passing it through an actual shrinking tunnel or by applying heat by some other means, e.g., a portable hand-held heat-gun. The resulting prototype shrunk sleeve has the original vertices marked thereon. The method includes measuring the vertices on the surface of the prototype shrunk sleeve in 3D. Thus a mapping is obtained between the 2D vertices on the fold out sheet, and the corresponding 3D vertices on the surface of the prototype shrunk sleeve. Joining the lines of the vertices to form a triangular mesh on each of the marked 2D foldout sheet and the 3D surface. Standard interpolation methods are used to provide the mapping from any point on the 2D foldout sheet to any point on the 3D surface of the shrunk sleeve model thus obtained.

Designing the Press-Ready Graphics and Presenting Visual Feedback

Referring again to the flow chart of FIG. 2, once the model of the shrunk sleeve is available to the method, the method proceeds to 213 of designing the press-ready graphics using computer implemented methods to display the shrinking process and the printing of graphics onto the shrunk sleeve surface.

Preparing the Press-Ready Graphics

In 205, the user designs and/or retrieves original graphics for rendering onto the sleeve. The original graphics may be in the form of one or more digital files. Computer system 311 may be used for designing, starting with the original graphics 101, and placing the original graphics to form the press-ready graphics 103. 205 further includes the user interactively, by viewing the screen 323 of the system 300, aligning 104 the press-ready graphics 103 with the foldout sleeve by positioning a rectangle with the dimensions of the foldout sleeve on top of the press-ready graphics 103. The aligning 104 includes translation of the press ready graphics, and rotation in multiples of 90 degrees. In one embodiment, the resulting alignment information is stored with the graphical file of the press-ready graphics 103.

Providing Visual Feedback of Shrinking and the Shrink Sleeve Shape

In 207, the 3D description of the shrunk sleeve is used to render the shrunk sleeve onto the screen 324 to provide the user with visual feedback of the shrinking process and of the shrunk sleeve. As described above, the shrunk sleeve shape is determined as a mesh of triangles. These are rendered at a selected viewpoint for display as a perspective view on the screen 324. In one embodiment, the surface of a shrunk or partially shrunk sleeve is also shaded for the display. How to show, render and shade a surface represented by a mesh of triangular planes is well known to those in the art.

Visual feedback of the shrinking process is typically of interest to the shrink-tunnel operator.

In one embodiment, a display also is provided of what are called "sleeve statistics", including the maximum required shrinking percentage, strain analysis on the sleeve, and/or strain analysis on the solid object. A display of shrinkage overlaid on the 2D shape of the foldout sleeve is useful to a graphic designer, e.g., to indicate regions that may undergo a relatively large amount of shrinkage and that therefore may cause excess distortion to graphics. The graphic designer may then choose not to include graphic elements whose shape is important in such regions.

Figure 16:
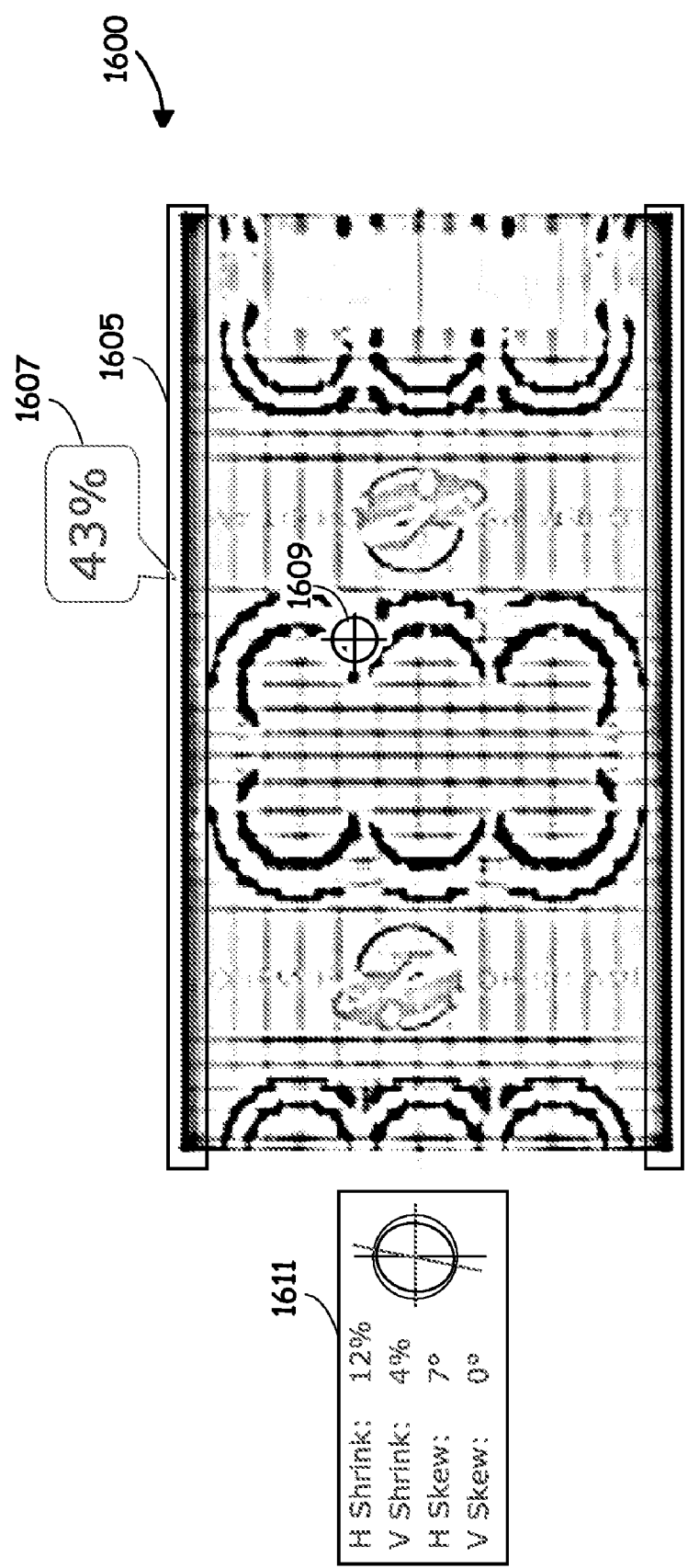
FIG. 16 shows an example of a screen display that overlays on the shape of the foldout sleeve a color-scale display of the amount of shrinkage, according to an embodiment of the invention.

FIG. 16 shows an example of a screen display 1600 that overlays on the shape of the foldout sleeve a color-scale display of the amount of shrinkage (shown here in black/white), and that provides interactive tools for displaying one or more of:

The amount of shrinkage.

The maximum shrinkage. In FIG. 16, the regions of maximum shrinkage are framed by rectangles 1605 and the maximum shrinkage is shown in a display 1607.

The sleeve folds—areas where the sleeve is folded.

In one embodiment, a meter-like-feature is included. A cursor structure is provided. When the cursor structure is placed over a point with the foldout sleeve area, e.g., the cursor 1609, a display 1611 appears showing such features as the horizontal and vertical shrink, and the horizontal and vertical skew.

In another embodiment, the shrink information from the shrinking process simulation is used to tune/modify one or more parameters of the actual shrinking process and/or to select different sleeve material and/or different positioning of the unshrunk sleeve.

One embodiment includes using the mapping of points on the 2D plane to the corresponding points in a 3D shrunk surface to calculate local distortion properties of the finalizing process, including one or more of the amount of local shrink and/or local shear. The method further includes displaying a representation of the local distortion properties to a user. In one embodiment, displaying includes providing a numerical output. In one embodiment, the displaying includes displaying on a display device an image of the surface of the sheet with a representation thereon of the local distortion properties. Alternatively, or in addition, in one embodiment, the displaying includes displaying on a display device an image of the 3D surface of the wrapped and finalized packaging with a representation thereon of the local distortion properties. One version of such a representation includes pseudocolors to represent the amount of shrinking and/or local shear.

A user viewing the display of the local distortion properties can select where to place graphics for printing on the surface of the packaging material.

Also, a user can display such local distortion properties for several types of packaging materials having different properties, and choose the packaging based, at least in part, on the displayed local distortion properties for the packaging material.

Rendering the Graphics onto the Shape to Provide a (Pre) View of the Printed Shrunk Sleeve In 209, the 3D description of the shrunk sleeve surface and the 2D image of the press-ready graphics with the alignment information are used to render the graphics onto the 2D shape of the shrunk sleeve and to provide an image of the shrunk sleeve with rendered graphics to the user.

Figure 11:
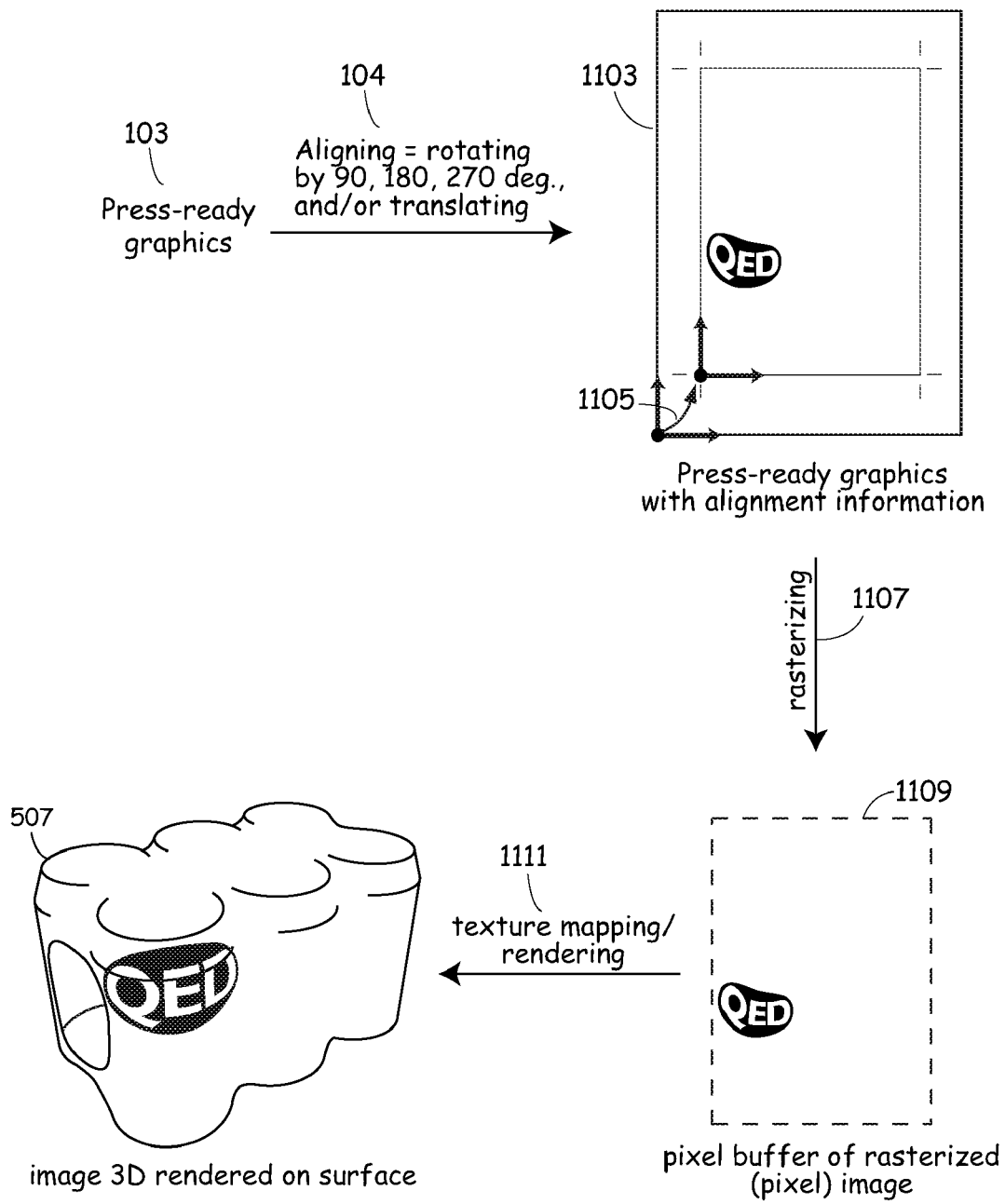
FIG. 11 shows, using an example, the process of rendering the graphics onto the surface of the shrunk sleeve for display to the user.

FIG. 11 shows, using an example, the process of rendering the graphics onto the surface model 507 of the shrunk sleeve 113 for display to the user. As a result of the aligning 104, a file 1103 is available that includes the press-ready graphics 103 and alignment information 1105.

The graphics inside the rectangle defining the outline of the foldout sleeve are converted into a pixel form, called rasterizing 1107 to result in a rasterized image (a "pixel image") 1109. In one embodiment, a buffer structure is used to store the pixel image. Such a structure is commonly called a pixel buffer.

In 1111, the pixel image 1109 is rendered onto the surface model 507 of the shrunk sleeve 113. Recall that in one embodiment, the model 507 of the surface includes a set of polygons, with each 3D vertex on the shrunk sleeve surface model having a corresponding 2D vertex location on the 2D foldout sheet. One method of rendering uses texture mapping. The 2D coordinates of each sleeve vertex of any polygon on the surface is used as texture coordinates for the pixel image 1109 to render the pixel image part onto the polygon. The result of the rendering is the rendered surface model 507 that, for a selected viewpoint, is displayed to the user in the display 324 of the system 300.

The 3D rendered image may be manipulated, e.g., rotated for view at different angles.

Having a 3D rendered view of what the packaging looks like is useful inside a graphics editor because it provides the packaging designer a view of the final packaging from different viewpoints. Such a rendering is also useful in pre-press, and can be used to provide for a graphic artist or designer almost instant feedback of the work on an impression of the final packaging.

Having such a 3D rendering is also useful in off-site viewing. In one embodiment, the rendered file may be exported to other formats, e.g., VRML, PDF and viewed and rotated with a 3rd party viewing tool.

Providing a preview may be useful to communicate intermediate results, e.g., for approval, avoiding the costly prior art method of printing and shrinking a sleeve onto an actual or prototype of the solid object. "Virtual shrinking" and displaying the results in 3D, as described herein, is faster, a lot cheaper than such a prior art method, and it does not require a shrink-tunnel, a printer/press that can handle the flexible sleeve material, or a physical prototype of the solid.

Other Aspects of Visualizing 3D and 2D Simultaneously

Thus, one embodiment of the invention includes simultaneously displaying a 2D display 323 of the foldout sleeve and a 3D display of the surface of the shrunk sleeve, and using the mapping between the 2D coordinates of points on the foldout sleeve and the 3D coordinates of corresponding points on the surface of the shrunk sleeve. Modifying one of the displays can then cause an update to the other display.

One of more of the following features are included in different embodiments of the invention.

A zoom-tool: One embodiment includes a tool that provides for selecting a region in the 3D display 324. As a result, a 2D window zooms in on the corresponding region of the 2D display. This can be used, for example, to display graphics within the selected region.

An auto-rotate tool: One embodiment includes a tool that provides for selecting a graphical element or a region in the 2D display 323. Such a selection causes the 3D display 324 of the surface of the surface of the shrunk sleeve to rotate to bring the selected graphics object or region to the center of the 3D window 324.

A 3D sketch tool: One embodiment includes a tool that provides for electronically drawing in the 3D window with one or more of a 'pencil' tool, a line tool, a circle tool, and other common electronic drawing tools. As a result, 2D layer of the drawing corresponding to what was drawn in 3D is stored. The 2D layer is displayed overlaid on main graphics layer on the 2D screen 323.

Compensating for Deformation(s) to the Graphics

Block 211 includes compensating for deformation(s) that occur(s) to the graphics during the shrinking process by pre-distorting the graphics placed on the press-ready graphics so that the graphics, after deformation, look undistorted. In one embodiment, to so compensate by pre-distorting uses the description of the shrinking process, and includes providing visual feedback to the user.

Figure 12A:
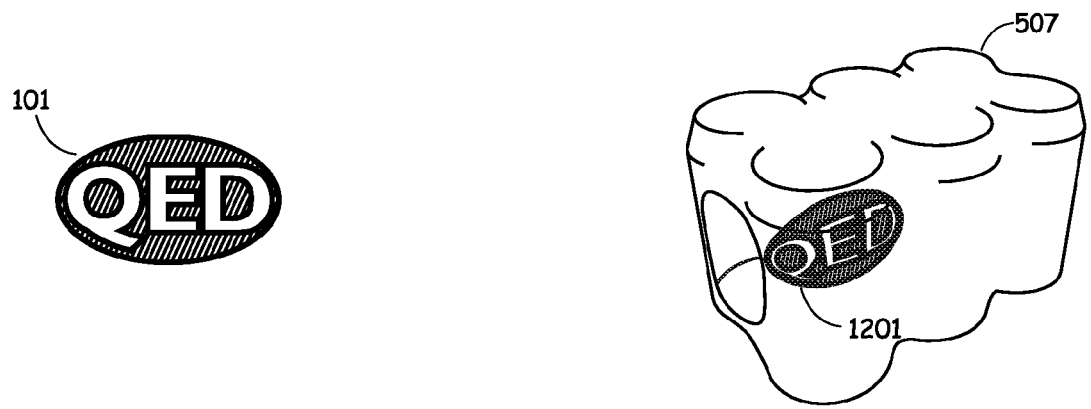
FIG. 12A shows original graphics placed, e.g., by texture mapping on the surface model of the shrunk sleeve.

FIGS. 12A, 12B, 12C, and 12D show the distortion caused by shrinking and compensation therefore. FIG. 12A shows original graphics 101 and further shows the original graphics 101 placed, e.g., by texture mapping on to the surface model 507 of the shrunk sleeve. The appearance of the rendering 1201, as can be seen, has a distorted appearance.

Figure 12B:
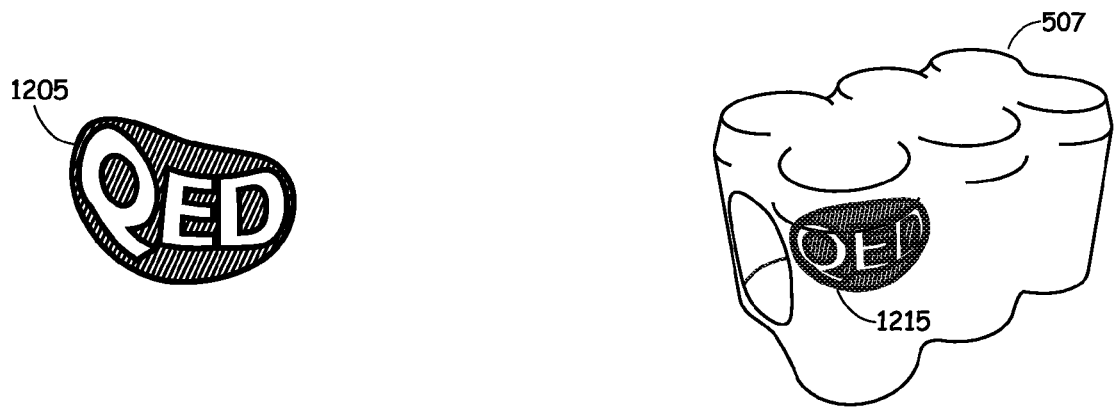
FIG. 12B shows a pre-distorted version of the original graphics placed, e.g., by texture mapping onto the surface of the shrunk sleeve model. As can be seen, such pre-distorting produces a better looking rendering on the surface of the shrunk sleeve according to an embodiment of the invention.

One embodiment of the invention includes pre-distorting the original graphics to compensate for the distortion. FIG. 12B shows a pre-distorted version 1205 of the original graphics, and a rendering 1215 of the pre-distorted graphics onto the surface of the shrunk sleeve model. As can be seen, such pre-distorting produces a better looking rendering on the surface of the shrunk sleeve.

Figure 12C:
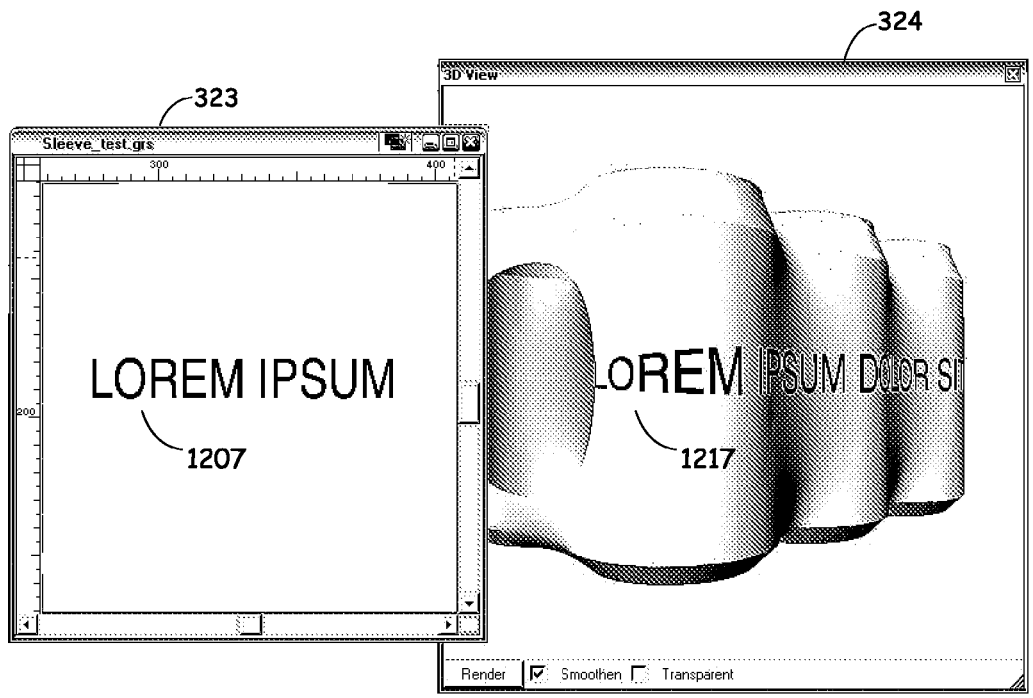

FIG. 12C shows an actual screen shot of a screen 323 for a 2D view of the foldout sheet with original graphics 1207, and a an actual screen shot of a screen 324 for a 3D perspective view of the shrunk sleeve, with the graphics rendered onto the surface. The rendering 1217 clearly looks distorted.

Figure 12D:
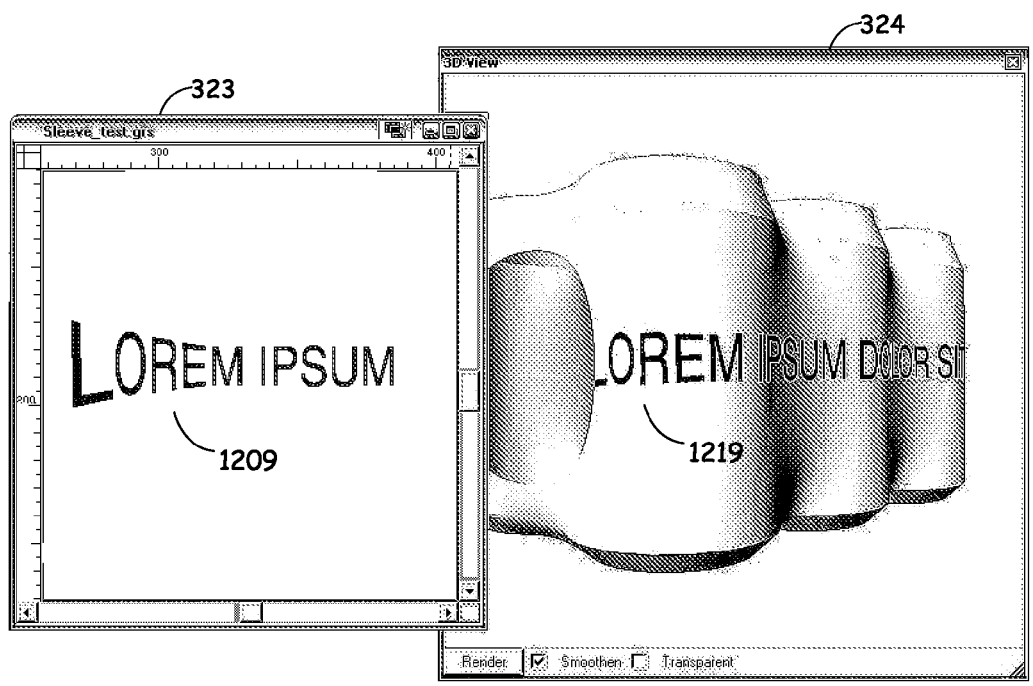
FIG. 12D shows actual screen shots of a 2D view of the foldout sheet with a pre-distorted version of the original graphics, and an actual screen shot of a screen for a 3D perspective view of the shrunk sleeve, according to an embodiment of the invention.

FIG. 12D shows an actual screen shot of a screen 323 for a 2D view of the foldout sheet with a pre-distorted version 1209 of the original graphics 1207, and a an actual screen shot of a screen 324 for a 3D perspective view of the shrunk sleeve, with the pre-distorted graphics rendered onto the surface. The rendering 1219 clearly looks less distorted than the rendering 1217.

Compensating for distortion(s) to the graphics includes building a pre-distortion function that maps every point of the original graphics to a point in a destination graphics file. This destination file eventually becomes the press-ready graphics file. In one version, the original graphics reside in a separate file, and in another version, the original graphics are obtained from the destination graphics file itself.

The nature of the distortions is such that there is no single "perfect" mapping of a 2D shape onto a curved surface that preserves all of angles, line lengths, horizontality of (2D) horizontal lines, and verticality of (2D) vertical lines. Furthermore, the nature of what properties are and are not preserved depends on the location on the 3D surface. Therefore, different types of distortions occur at different regions in all but the simplest of shapes.

Furthermore, with all but the simplest of shapes, e.g., circularly symmetric shrunk sleeve shapes that vary smoothly, the inventors have found it difficult to automatically determine a single pre-distortion function that can be applied to a complete image of the press-ready graphics that covers the whole area of the foldout sheet.

Thus, one embodiment of the invention provides a selection of pre-distortion functions, e.g., pre-defined or automatic pre-distortion functions, some of which may be applied regionally, e.g., to graphic elements that are to appear at different parts of the shrunk sleeve surface. With the ability to preview in the 3D screen 324 the results of applying changes to 2D graphics, e.g., as appearing on the 2D display screen 323, the designer can view the results of using one or another pre-distortion function, or a combination of pre-distortion functions.

One embodiment of the invention provides for interactive modification of pre-distortion functions. According to this feature, one or more pre-defined or automatically calculated pre-distortion functions are applied. The viewer previews the results and selects a pre-distortion function to start with. The method further includes the user, viewing the 3D and/or the corresponding 2D screen, interactively modifies the pre-distortion mapping such the results are "good enough." In one embodiment, the selected initial pre-distortion function is applied to an image of a 2D rectangular grid of vertices. The pre-distorted grid is then texture mapped onto the surface model of the shrunk sleeve (in general, the finalized package surface model). Thus, in the 3D display 324, a surface containing the corresponding vertex points in 3D is displayed.

In a first variant, the user may interactively rotate the 3D view in screen 324 to obtain a selected viewing angle, and then uses a user input device such as a mouse or pen to interactively move on the screen 324 one or more of the vertices on the surface until the resulting image on the surface look like a rectangular grid.

The new 3D coordinates of the vertices on the surface have corresponding points on the 2D foldout sleeve. These 2D coordinates are the result of pre-distorting a 2D rectangular grid. Interpolation leads to a pre-distortion function to apply.

In a second variant, the user may interactively rotate the 3D view in screen 324 to obtain a selected viewing angle, and then uses a user input device such as a mouse or pen to interactively move on the screen 323 one or more of the 2D pre-distorted vertices, while viewing the resulting changes of the corresponding vertices on the 3D surface display 324 until the resulting image on the surface looks like a rectangular grid. The (possibly newly positioned) 2D coordinates of the vertices on the 2D foldout screen image are the result of pre-distorting a 2D rectangular grid. Interpolation leads to a pre-distortion function to apply to any arbitrary graphic element of approximately the same size, aimed at approximately the same region.

In one embodiment, the pre-distortion function is combined with the mapping from 2D coordinates on the foldout sleeve to corresponding 3D coordinates on the surface model of the shrunk sleeve to provide a warping mapping to render graphics to a region on the surface of the shrunk sleeve. We call such combined pre-distortion and mapping to the surface warp mapping from a 2D graphic element to the surface of the shrunk sleeve.

PACKEDGE™ by Esko-Graphics NV of Gent Belgium, associated with the assignee of the present invention, is a product that includes several pre-defined warp mappings from a 2D graphic element to the surface of a set of simple shapes such as cylinders and cones representing bottles, cones, and so forth that can suitably describe different parts of a shrunk sleeve. Such pre-defined warp mappings can provide for the initial pre-distortion functions. ARTPRO™, by ArtPro Systems NV of Gent, Belgium is believed to also have a tool to help pre-distort 2D graphics to correct for mapping such graphics onto relatively simple shapes.

Any given warp mapping can be used to render original graphics onto the surface display of a shrunk sleeve by a rendering method that includes:

Determining a bounding box of the original graphics.

Rendering the original graphics to a pixel image inside the bounding box.

Dividing the bounding box into a triangle mesh.

Apply the warp mapping function to every vertex of the triangle mesh. This creates a 3D triangle mesh.

Use the pixel image as a texture map to render this triangular mesh in 3D on top of a 3D rendering of the shrunk sleeve surface at a particular viewpoint. The texture-coordinates are defined by the position of the vertices in the original graphics.

Once such a rendering is obtained, the user may rotate and/or move the viewpoint (the so-called camera position for a perspective view rendering) using an input device such as a mouse and re-render onto the surface from the new viewpoint.

Figure 13:
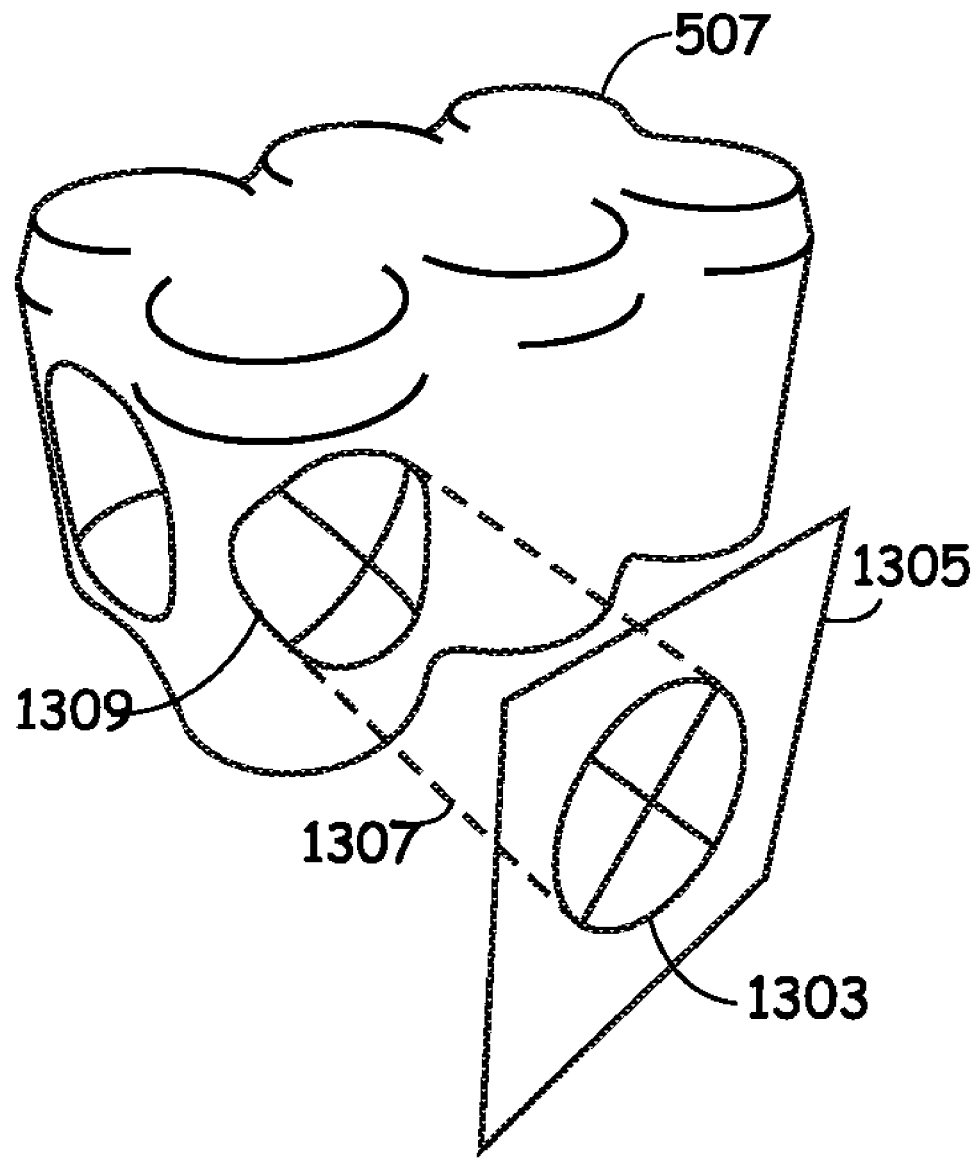
FIG. 13 shows a first, simple warp mapping function called parallel projection, to map a graphic element onto the surface of the shrunk sleeve according to an embodiment of the invention.

FIG. 13 shows a first, simple warp mapping function—parallel projection—to map a graphic element onto the surface of the shrunk sleeve. The parallel projection mapping method includes copying a desired element 1303 of the original graphics to a plane 1305 in 3D. The method further includes projecting the graphics element 1303 on the plane 1305 (see projections lines 1307) onto the surface model 507 of the shrunk sleeve in a selected direction, e.g., perpendicular to the plane. The resulting image 1309 is the intersection of the projection on the surface.

The orientation of the plane 1305, the position and rotation of graphics on the plane and the projection-direction are specified by the user.

Mapping the graphics on a given plane is straightforward. The projecting is calculated by tracing a ray from a position on the plane in a selected projection direction until it intersects the surface of the shrunk sleeve.

Figure 14:
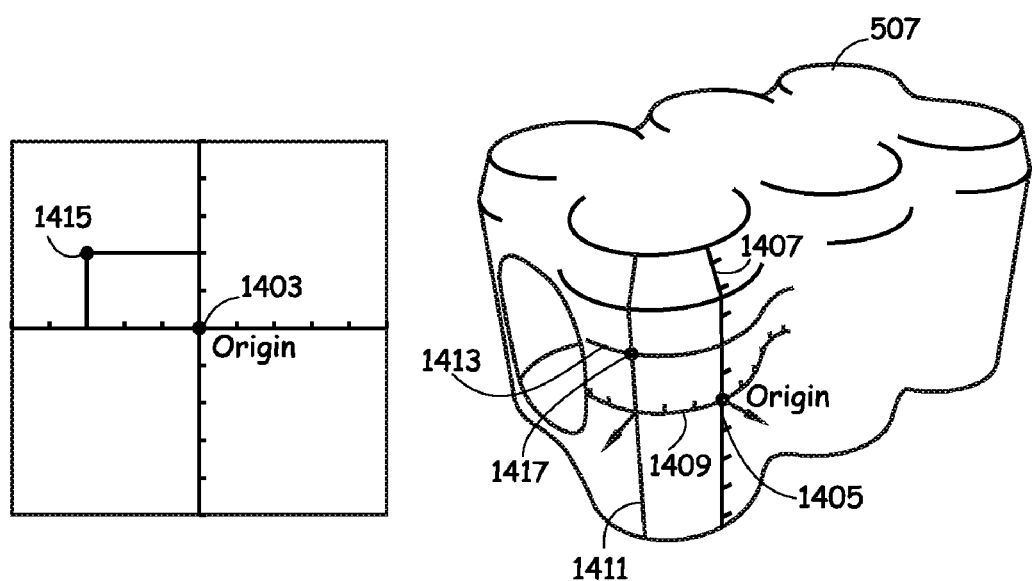
FIG. 14 shows a second warp mapping function—the "two-plane projection method"—to map a graphic element onto the surface of the shrunk sleeve according to an embodiment of the invention.

FIG. 14 shows a second warp mapping function—the "two-plane projection method"—to map a graphic element onto the surface of the shrunk sleeve. This projection is very suited for solid objects that behave (locally) as a generalized cylinder, or generalized cone.

In the description of the two-plane projection method, by an "up-vector" is meant a user specified vector that defines the direction of the generalized cylinder/cone that the shrunk sleeve resembles in a region of interest, by the "vertical plane" is meant a plane that has a normal that is perpendicular to the up-vector, and by the "horizontal plane" is meant a plane that is perpendicular to the up-vector.

The following describes one embodiment of how to project a user-specified point onto the surface model of the shrunk sleeve.

The user chooses a point 1403 in an element of the original graphics as the origin, and further specifies a 3D point 1405 on the shrunk sleeve surface onto which the origin is to be projected. Alternately, the origin can also be the center of the bounding box around the original graphics element. The user also specifies on which 3D point on the sleeve surface this original will be projected.

A vertical curve 1407 is constructed as the intersection of the shrunk sleeve surface with a vertical plane that runs through the origin and contains the normal at the origin.

A horizontal curve 1409 is constructed as the intersection of the surface with a horizontal plane that runs through the origin.

For every point (x,y) in the original graphics, an X-plane is constructed in the 3D space by starting at the origin 1405 and following the horizontal curve 1409 for a distance x, either to the left or the right, depending on the sign of x. Through the destination point on the sleeve surface 507, a vertical plane 1411 is constructed that contains the local normal.

Y-plane: For every point (x,y) in the original graphics, a Y-plane is constructed by starting at the origin and following the vertical curve 1407 for a distance y, either up or down, depending on the sign of y. Through the destination point, a horizontal plane 1413 is constructed.

Projection: The X-Plane and Y-plane intersect at a horizontal line. On this line, a ray is traced. The first intersection point 1417 defines the 3D projection of a particular point (x,y) 1415 in the original graphics coordinate system.

Note that in FIG. 14, for the X-plane and Y-plane, only the intersection curve with the sleeve surface 507 is shown.

Thus, some methods have been described or provided that map any point in the original graphics, e.g., in a graphic element of the original graphics, onto a corresponding point on the surface model 507 of the shrunk sleeve. These 3D-points are converted back into the 2D-space of the press-ready graphics. One can think of this operation as the opposite of texture mapping. Recall that in one embodiment, the sleeve model 507 is maintained as a mesh of triangles, with the vertices having their 3D coordinates stored together with their corresponding 2D coordinates in the press ready graphics coordinate system. In one embodiment, the method includes: for every 3D point on the sleeve surface 507, determine what triangle it is in. Determine the corresponding 2D position of the 3D point is by linear interpolation of the foldout sleeve positions of the three sleeve vertices. Apply the user-specified CAD-graphics alignment transformation to map the determined 2D position on the foldout rectangle to the corresponding position on the press-ready graphics.

Thus a set of pre-distortion functions applicable for different situations is obtained.

Applying the Pre-Distortion Function

If one applies the pre-distortion function on the original graphics, this will, by definition, generate the desired appearance on the Shrunk sleeve.

A first method of applying the pre-distortion function is by grid-warping. Warping in general is a shape distorting process used in computer graphics for the task of placing 2D graphics on a curved surface and viewing the 3D result on a 2D screen with a particular perspective view of the 3D surface. Tools to aid warping for the purpose of so placing a 2D graphic on a curved surface are known. PHOTOSHOP™ CS2 by Adobe Systems Inc., San Jose, Calif., for example, has a warp system that allows one to warp a 2D image to render it onto a 3D surface view. ILLUSTRATOR™ 10 has a function called "Envelope Distort with Mesh" that carries out a grid warp method similar to the Photoshop method. Note that the PHOTOSHOP™ and the Illustrator ILLUSTRATOR™ systems are about how to wrap the 2D graphics on a 3D surface so that a 2D perspective view looks correct.

Figure 15A:
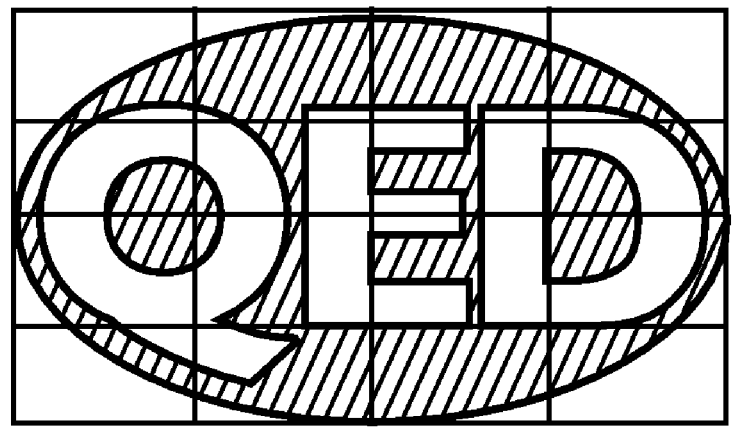
FIGS. 15A and 15B show how graphics are pre-distorted using grid warping according to an embodiment of the invention.
Figure 15B:
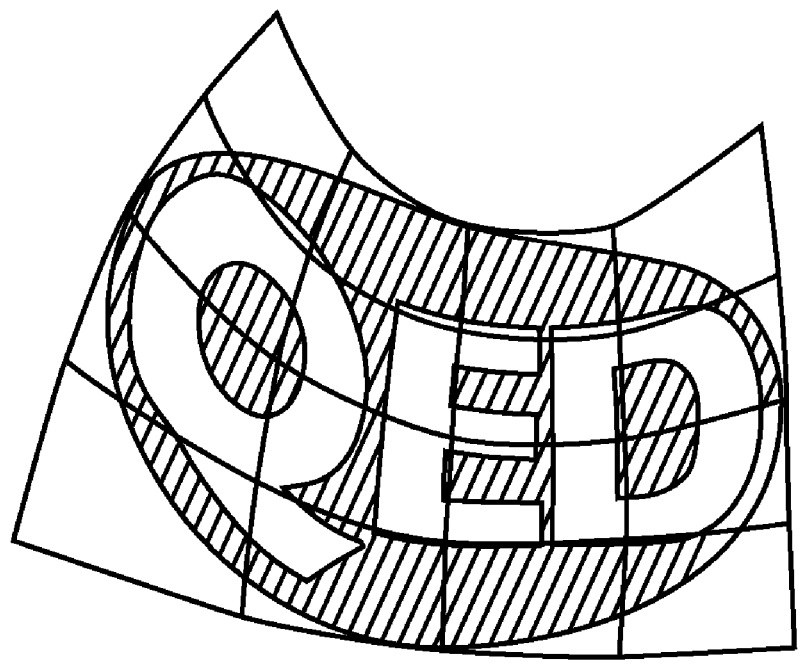

FIGS. 15A and 15B show how graphics can be pre-distorted using grid warping. The method includes, as shown in FIG. 15A, constructing a rectangular grid of point on the original graphics, and, as shown in FIG. 15B, evaluating a second grid of points by applying the pre-distortion function to the original grid points.

To apply a grid-warp algorithm on the original graphics, the first grid being the "source grid", the second grid being the "destination grid."

Alternate methods of applying the pre-distortion function also are known. In the case of original graphic elements composed of line art described by vector and curves that have control points, the method includes evaluating the pre-distortion function on the control points of the vectors and curves.

As already described above, the pre-distortion function may be manually modified from that calculated automatically, for example, as calculated by the above projection methods to provide improved results.

Thus has been described a computer-implemented method that provides tools for a user to create and manipulate graphics for use on flexible packaging such as shrink packaging, stretch packaging, and so forth. Thus also has been described a computer-implemented method that provides for simulating the finalizing of the packaging process using flexible packaging, e.g., the shrinking of a shrink sleeve around a solid object.

While the embodiments described above for the shrink packaging case are for packaging materials that are shrunk by heat, the methods, computer programs, and the apparatus described herein may be modified by including other physics models that simulate other flexible packaging materials, such as bags, stand-up pouches, tubes, and so forth, and shrinking processes other than by heat.

Note that the term "automatically" is used at several points in the description. In some embodiments, the automatic task may be performed after the user commands the system to do so, e.g., by a click on a graphically displayed button, and in other embodiments, the automatic task may be performed with no explicit user command, such as a click on a graphically displayed button. The term automatic and automatically encompass both cases.

Unless specifically stated otherwise, as apparent from the following discussions, it is appreciated that throughout the specification discussions utilizing terms such as "ascertaining," "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "CPU" and "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by a machine which includes a one or more processors that accept computer-readable (also called machine-readable) code containing instructions. For any of the methods described herein, when the instructions are executed by the machine, the machine performs the method. Any machine capable of executing a set of instructions (sequential or otherwise) that specify actions to be taken by that machine are included. Thus, one a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that stores computer-readable code (e.g., software) including instructions for performing, when executed by the processing system, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute carrier medium storing computer-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive feature. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., a one or more processors that are part of carton design system. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries computer readable code for controlling a processing system to implement a method. Accordingly, embodiments of the present invention may take the form of a method, an entirely hardware embodiment, an entirely software embodiment or an embodiment combining software and hardware. Furthermore, the present invention may take the form of carrier medium (e.g., a computer program product on a computer-readable storage medium) carrying computer-readable program code embodied in the medium.

The software may further be transmitted or received over a network via the network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing a set of instructions for execution by the machine and that cause the machine to perform any one or more of the methodologies of the present invention. A carrier medium may take many forms, including but not limited to, non-volatile media and volatile media. Non-volatile media includes, for example, optical, magnetic disks, and magneto-optical disks. Volatile media includes dynamic memory, such as main memory. For example, the term "carrier medium" shall accordingly be taken to include, but not be limited to, solid-state memories, and optical and magnetic media.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive features. This method of disclosure, however, is not to be interpreted as reflecting an intention that the claimed invention requires more features than are expressly recited in each claim. Rather, as the following claims reflect, inventive features lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method of processing using a processing system, the method comprising:

accepting a description of the surface of a flexible sheet of packaging material; and generating a description of a finalized surface of the packaging material sheet that results from a physical wrapping and physical finalizing process during which the packaging material sheet is wrapped around a 3D object and finalized, the 3D object having a surface, the description of the finalized surface including a mapping between 2D coordinates of points on the packaging material sheet and 3D coordinates of corresponding points on the surface of a wrapped and finalized version of the packaging material after the packaging material sheet is wrapped around the 3D object and finalized, wherein the method is further defined by at least one of A, B, C, D, and E, A being that the method further comprises:

accepting graphics for printing onto the surface of the packaging material sheet, and pre-distorting the graphics for printing onto the surface of the packaging material sheet, the pre-distorting to correct for any distortions to the graphics that occurs during the wrapping and finalizing process, such that after printing the pre-distorted graphics onto the surface of the packaging material sheet, wrapping and finalizing, the graphics appears relatively undistorted; and using the mapping to determine, using the processing system, the distortion that occurs to the accepted graphics during the wrapping and finalizing, B being that the generating of the description of the finalized surface comprises:
  accepting properties of the packaging material sheet to be wrapped around the object;
  accepting a model of the wrapping and finalizing process; and
  running the model of the wrapping and finalizing process to obtain the mapping between 2D coordinates and 3D coordinates,
C being that the mapping is obtained by a process that comprises:
  wrapping a sample of the packaging material sheet around a sample of the 3D object, said packaging material sheet including indicia whose position is known or measurable in 2D;
  finalizing the combination of the sample of the 3D object with the sample packaging material sheet wrapped around the 3D object to produce a sample of the packaging material wrapped and finalized around the 3D object; and
  measuring the 3D position of the indicia on the surface of the sample packaging material sheet wrapped and finalized around the 3D object to obtain the mapping between 2D coordinates and 3D coordinates,
D being that the packaging material sheet is shrink packaging printed with original graphics that is positioned to form a foldout sleeve, the foldout sleeve is made into an unshrunk sleeve that is wrapped around the 3D object, that the finalizing includes shrinking the unshrunk sleeve that is wrapped around the 3D object to form the finalized version of the packaging material sheet in the form of a shrunk sleeve, and that the method further comprises:
  displaying to a user a 2D display of the foldout sleeve and a perspective view of the surface of the shrunk sleeve in a 3D display, and
  using a mapping between 2D coordinates of points on the foldout sleeve and 3D coordinates of corresponding points on the surface of the shrunk sleeve in such a manner that modifying one of the displays automatically causes an update to the other display, and
E being that the method further comprises:
  using the mapping between coordinates of points on the 2D plane of the packaging material sheet and the corresponding points on the 3D surface of the packaging material sheet wrapped around the 3D object to calculate local distortion properties of the finalizing process, including one or more of the amount of local shrink and/or local shear; and
  displaying a representation of the local distortion properties to a user.

2. The method as recited in claim 1, further comprising:
displaying to a user on a display device the surface of the wrapped and finalized version of the packaging material sheet.

3. The method as recited in claim 2, further comprising:
displaying one or more graphic elements on the displayed surface of the wrapped and finalized version of the packaging material sheet.

4. The method as recited in claim 1, comprising the additional steps of:
accepting graphics for printing onto the surface of the packaging material sheet, and pre-distorting the graphics for printing onto the surface of the packaging material sheet, the pre-distorting to correct for any distortions to the graphics that occurs during the wrapping and finalizing process, such that after printing the pre-distorted graphics onto the surface of the packaging material sheet, wrapping and finalizing, the graphics appears relatively undistorted,
when said method of processing was not further defined by A.

5. The method as recited in claim 1, wherein A, further comprising:
using the mapping to determine the distortion that occurs to the graphics during the wrapping and finalizing process.

6. The method as recited in claim 1, wherein A, further comprising:
displaying to a user on a display device the surface of the wrapped and finalized version of the packaging material sheet; and
displaying the graphics on the displayed surface of the wrapped and finalized version of the packaging material sheet.

7. The method as recited in claim 6, further comprising:
displaying to the user results of using different pre-distortion functions, such that the user can select one or more pre-distortion functions to use.

8. The method as recited in claim 7, wherein at least one of the pre-distortion functions is a modifiable pre-distortion function.

9. The method as recited in claim 1, wherein A, further comprising:
generating press-ready graphics from the pre-distorted graphics for printing onto the surface of the packaging material sheet.

10. The method as recited in claim 1, wherein the generating of the description of the finalized surface comprises:
(a) accepting properties of the packaging material sheet to be wrapped around the object;
(b) accepting a model of the wrapping and finalizing process; and
(c) running the model of the wrapping and finalizing process to obtain the mapping from points on the 2D plane of the packaging material sheet to points on the 3D surface of the packaging material sheet wrapped around the 3D object;
when said method of processing was not further defined by B.

11. The method as recited in claim 1, wherein B, further comprising:
accepting a description of the 3D object to be wrapped;
representing the 2D plane of the packaging material sheet as a set of discrete elements;
determining forces on the discrete elements; and
moving the discrete elements to find an equilibrium of these forces, the moving constrained by the surface of the 3D object.

12. The method as recited in claim 1, wherein B, further comprising:
displaying to a user on a display device a 3D visualization of the finalized surface of the wrapped and finalized version of the packaging material sheet.

13. The method as recited in claim 12, wherein the packaging material sheet is shrink wrap packaging, and wherein the finalizing is a shrinking process according to one or more parameters, such that the 3D visualization is usable by an operator of a shrink process for tuning the shrinking process.

14. The method as recited in claim 1, wherein the mapping is obtained by a process that comprises:
(a) wrapping a sample of the packaging material sheet around a sample of the 3D object, said material including indicia whose position is known or measurable in 2D;
(b) finalizing the combination of the sample of the 3D object with the sample packaging material sheet wrapped around the 3D object to produce a sample of the packaging material wrapped and finalized around the 3D object; and (c) measuring the 3D position of the indicia on the surface of the sample packaging material sheet wrapped and finalized around the 3D object to obtain the mapping from points on the 2D plane of the packaging material to points on the 3D surface of the packaging material wrapped around the 3D object;

when said method of processing was not further defined by C.

15. The method as recited in claim 1, wherein the packaging material sheet is shrink packaging printed with original graphics that is positioned to form a foldout sleeve, the foldout sleeve is made into an unshrunk sleeve that is wrapped around the 3D object, and wherein the finalizing includes shrinking the unshrunk sleeve that is wrapped around the 3D object to form the finalized version of the packaging material sheet in the form of a shrunk sleeve;

when said method of processing was not further defined by D.

16. The method as recited in claim 15, further comprising:
displaying to a user a 2D display of the foldout sleeve and a perspective view of the surface of the shrunk sleeve in a 3D display, and using a mapping between 2D coordinates of points on the foldout sleeve and 3D coordinates of corresponding points on the surface of the shrunk sleeve in such a manner that modifying one of the displays automatically causes an update to the other display.

17. The method as recited in claim 16, wherein the displaying can simultaneously display to the user the 2D display of the foldout sleeve and the perspective view of the surface of the shrunk sleeve.

18. The method as recited in claim 1, further comprising:
(a) using the mapping of points on the 2D plane of the packaging material sheet to the corresponding points on the 3D surface of the packaging material sheet wrapped around the 3D object to calculate local distortion properties of the finalizing process, including one or more of the amount of local shrink and/or local shear; and (b) displaying a representation of the local distortion properties to a user;

when said method of processing was not further defined by E.

19. The method as recited in claim 1, wherein E, further comprising:
displaying a numerical output.

20. The method as recited in claim 1, wherein E, further comprising:
displaying on a display device an image of the surface of the packaging material sheet with a representation thereon of the local distortion properties.

21. The method as recited in claim 1, wherein E, further comprising:
displaying on a display device an image of the surface of the wrapped and finalized packaging with a representation thereon of the local distortion properties.

22. The method as recited in claim 1, wherein E, further comprising:
the user selecting where to place graphics for printing on the surface of the packaging material sheet based on the displayed local distortion properties.

23. The method as recited in claim 1, wherein E, further comprising:
the user choosing the packaging material sheet based on the displayed local distortion properties for the packaging material sheet.

24. A method of processing using a processing system, the method comprising:
accepting in the processing system a description of a surface of a preform for packaging; and generating, using the processing system, a description of the 3D finalized surface of a finalized version of the preform after the preform is placed around a 3D object and finalized by a finalizing process, the description including a mapping between coordinates of points on the surface of the preform prior to finalizing and corresponding points on the 3D finalized surface of the finalized version of preform after the preform is placed around the 3D object and finalized, wherein the generating the description of the 3D finalized surface includes:
accepting properties of material the preform is made of;
accepting a model of the finalizing process; and
running the model of the finalizing process to obtain the mapping from points on the surface of the preform prior to finalizing to points on the 3D surface of the finalized version of the preform around the 3D object, wherein running the model uses a finite element method to find a result of the finalizing process that shapes the preform, wherein the preform is printed with graphics that are pre-distorted to account for distortions of the finalizing process.

25. The method of processing as recited in claim 24, wherein the printing and pre-distorting includes:
accepting graphics for printing onto the surface of the preform, and pre-distorting the graphics for printing onto the surface of the preform, the pre-distorting to correct for any distortions to the graphics that occurs during the finalizing process, such that after printing the pre-distorted graphics onto the surface of the preform, and after finalizing, the graphics appears relatively undistorted.

26. The method of processing as recited in claim 25, further comprising:
generating press-ready graphics from the pre-distorted graphics for printing onto the surface of the preform.

27. At least one non transitory computer-readable storage medium having a computer program stored thereon that when executed by one or more processors causes an apparatus that includes the one or more processors to perform the following steps:
accepting a description of the surface of a sheet of flexible packaging material; and generating a description of a finalized surface of the packaging material sheet after the packaging material sheet is wrapped around a 3D object and finalized, the 3D object having a surface, the description of the finalized surface including a mapping between 2D coordinates of points on the packaging material sheet and 3D coordinates of corresponding points on the surface of a wrapped and finalized version of the packaging material sheet after the packaging material sheet is wrapped around the 3D object and finalized by a wrapping and finalizing process;

wherein the steps are further defined by at least one of A, B, C, D, and E,

A being that the computer program when executed further causes:
pre-distorting graphics accepted for printing onto the surface of the packaging material sheet, the pre-distorting to correct for any distortions to the graphics that occurs during the wrapping and finalizing, such that after printing the pre-distorted graphics onto the surface of the packaging material sheet, wrapping and finalizing, the graphics appears relatively undistorted; and using the mapping to determine, using the processing system, the distortion that occurs to the accepted graphics during the wrapping and finalizing, B being that the generating of the description of the finalized surface comprises:
accepting properties of the packaging material sheet to be wrapped around the object;
accepting a model of the wrapping and finalizing process; and
running the model of the wrapping and finalizing process to obtain the mapping between 2D coordinates and 3D coordinates, C being that the mapping is obtained by a process that comprises:
wrapping a sample of the packaging material sheet around a sample of the 3D object, said packaging material sheet including indicia whose position is known or measurable in 2D;
finalizing the combination of the sample of the 3D object with the sample packaging material sheet wrapped around the 3D object to produce a sample of the packaging material wrapped and finalized around the 3D object; and
measuring the 3D position of the indicia on the surface of the sample packaging material sheet wrapped and finalized around the 3D object to obtain the mapping between 2D coordinates and 3D coordinates, D being that the packaging material sheet is shrink packaging printed with original graphics that is positioned to form a foldout sleeve, the foldout sleeve is made into an unshrunk sleeve that is wrapped around the 3D object, that the finalizing includes shrinking the unshrunk sleeve that is wrapped around the 3D object to form the finalized version of the packaging material sheet in the form of a shrunk sleeve, and that the computer program when executed further causes:
displaying to a user a 2D display of the foldout sleeve and a perspective view of the surface of the shrunk sleeve in a 3D display, and
using a mapping between 2D coordinates of points on the foldout sleeve and 3D coordinates of corresponding points on the surface of the shrunk sleeve in such a manner that modifying one of the displays automatically causes an update to the other display, and E being that the computer program when executed further causes:
using the mapping of coordinates of points on the 2D plane of the packaging material sheet and the corresponding points on the 3D surface of the packaging material sheet wrapped around the 3D object to calculate local distortion properties of the finalizing process, including one or more of the amount of local shrink and/or local shear; and
displaying a representation of the local distortion properties to a user.

28. The at least one non transitory computer-readable storage medium as recited in claim 27, wherein the steps further comprise:
displaying to a user on a display device the surface of the wrapped and finalized version of the packaging material sheet.

29. The at least one non transitory computer-readable storage medium as recited in claim 28, wherein the steps further comprise:
displaying one or more graphic elements on the displayed surface of the wrapped and finalized version of the packaging material sheet.

30. The at least one non transitory computer-readable storage medium as recited in claim 27, wherein the computer program when executed further causes:
(a) pre-distorting graphics accepted for printing onto the surface of the packaging material sheet, the pre-distorting to correct for any distortions to the graphics that occurs during the wrapping and finalizing, such that after printing the pre-distorted graphics onto the surface of the sheet of packaging material sheet, wrapping and finalizing, the graphics appear relatively undistorted, when the steps are not further defined by A.

31. The at least one non transitory computer-readable storage medium as recited in claim 27, wherein A, further comprising:
using the mapping to determine the distortion that occurs to the graphics during the wrapping and finalizing process.

32. The at least one non transitory computer-readable storage medium as recited in claim 27, wherein A, further comprising:
displaying to a user on a display device the surface of the wrapped and finalized version of the packaging material sheet; and
displaying the graphics on a displayed surface of the wrapped and finalized version of the packaging material sheet.

33. The at least one non transitory computer-readable storage medium as recited in claim 27, wherein the generating of the description of the finalized surface comprises:
(a) accepting properties of the packaging material sheet;
(b) accepting a model of the wrapping and finalizing process; and
(c) running the model of the wrapping and finalizing process to obtain the mapping from points in the 2D plane to points in the 3D surface of the wrapping material wrapped around the 3D object;
when the steps are not further defined by B.

34. The at least one non transitory computer-readable storage medium as recited in claim 27, wherein B, further comprising:
accepting a description of the 3D object to be wrapped;
representing the 2D plane of the packaging material sheet as a set of discrete elements;
determining forces on the discrete elements; and
moving the discrete elements to find an equilibrium of these forces, the moving constrained by the surface of the 3D object.

35. A method of processing using a processing system, the method comprising:
accepting in the processing system graphics for printing onto a surface of a flexible packaging material sheet;
pre-distorting the graphics for printing onto the surface of the packaging material sheet, the pre-distorting to correct for distortions to the graphics that occurs during a wrapping process that wraps the packaging material sheet around a 3D object and a finalizing process that finalizes the packaging material sheet, such that after printing the pre-distorted graphics onto the surface of the packaging material sheet, wrapping and finalizing, the graphics appears relatively undistorted;
displaying to a user on a display device an image of the surface of the wrapped and finalized packaging material sheet;
accepting a model of the wrapping and finalizing process; and running the model of the wrapping and finalizing process to determine the distortion that occurs to the graphics during the wrapping and finalizing process, wherein in the case the finalizing process produces distortions in multiple directions, the pre-distorting includes pre-distorting in multiple directions.

36. The method as recited in claim 35, further comprising:
displaying one or more graphic elements on the displayed surface of the wrapped and finalized version of the packaging material sheet.

37. The method as recited in claim 36, further comprising:
accepting properties of the packaging material sheet to be wrapped around the object.

38. The method as recited in claim 35, further comprising:
determining the distortion that occurs to the graphics during the wrapping and finalizing process.

39. The method as recited in claim 35, wherein the packaging material sheet is shrink packaging, the packaging material sheet is printed with original graphics that are positioned to form a foldout sleeve, the foldout sleeve is made into an unshrunk sleeve that is wrapped around the 3D object, and wherein the finalizing includes shrinking the unshrunk sleeve that is wrapped around the 3D object to form the wrapped and finalized version of the packaging material sheet in the form of a shrunk sleeve.

40. The method as recited in claim 39, further comprising:
displaying to a user a 2D display of the foldout sleeve and a display of a perspective view of the surface of the shrunk sleeve in a 3D display, and
using a mapping between 2D coordinates of points on the foldout sleeve and 3D coordinates of corresponding points on the surface of the shrunk sleeve in such a manner that modifying either the 2D display or the display of the perspective view automatically causes an update to the not being modified display.

41. A method of processing using a processing system, the method comprising:
accepting in the processing system a description of the surface of flexible packaging material sheet, the description including a model of a foldout sleeve material, and
generating, using the processing system, a description of a finalized surface of the packaging material sheet after the packaging material sheet is wrapped around a 3D object and finalized, the description of the finalized surface including a mapping between 2D coordinates of points on the packaging material sheet and 3D coordinates of corresponding points on the surface of a wrapped and finalized version of the packaging material sheet after the packaging material sheet is wrapped around the 3D object and finalized,
wherein the generating the description of the finalized surface includes:
accepting in the processing system properties of the packaging material sheet to be wrapped around the object;
accepting a model of the wrapping and finalizing process; and
running the model of the wrapping and finalizing process to obtain the mapping from points on the 2D plane of the packaging material sheet to points on the 3D surface of the packaging material sheet wrapped around the 3D object.

42. The method as recited in claim 41,
wherein the packaging material sheet includes indicia whose position is known or measurable in 2D; and
wherein the mapping is obtained by measuring the 3D position of the indicia on the surface of a sample packaging material sheet wrapped and finalized around the 3D object to obtain the mapping from points on the 2D plane of the packaging material sheet to points on the 3D surface of the packaging material wrapped around the 3D object.

43. The method as recited in claim 41,
whereby running the model uses a finite element method to find a result of the finalizing process that shapes the packaging material sheet, wherein the packaging material sheet is printed with graphics that are pre-distorted to account for distortions caused by the finalizing process.

44. The method as recited in claim 41, further comprising:
accepting in the processing system graphics for printing onto the surface of a flexible packaging material sheet, and pre-distorting, using the processing system, the graphics for printing onto the surface of the packaging material sheet, the pre-distorting to correct for any distortions to the graphics that occurs during wrapping that wraps the packaging material sheet around the 3D object and finalizing that finalizes the packaging material sheet, such that after printing the pre-distorted graphics onto the surface of the packaging material sheet, wrapping and finalizing, the graphics appears relatively undistorted; and
displaying to a user on a display device an image of the surface of the wrapped and finalized version of the packaging material sheet,
wherein the surface of the wrapped and finalized packaging is a non-circularly symmetric surface.

45. At least one non transitory computer-readable storage medium having a computer program stored thereon that when executed by one or more processors causes an apparatus that includes the one or more processors to:
accept a description of the surface of a sheet of flexible packaging material sheet, the description including a model of a foldout sleeve material, and
generate a description of a finalized surface of the packaging material sheet that results from a physical wrapping and physical finalizing process during which the packaging material sheet is wrapped around a 3D object and finalized, the description of the finalized surface including a mapping between 2D coordinates of points on the packaging material sheet and 3D coordinates of corresponding points on the surface of a wrapped and finalized version of the packaging material sheet after the packaging material sheet is wrapped around the 3D object and finalized,
wherein generating the description of the finalized surface includes:
accepting properties of the packaging material sheet to be wrapped around the 3D object;
accepting a model of the wrapping and finalizing process; and
running the model of the wrapping and finalizing process to obtain the mapping from points on the 2D plane of the packaging material sheet to points on the 3D surface of the packaging material sheet wrapped around the 3D object.

\* \* \* \* \*

UNITED STATES PATENT AND TRADEMARK OFFICE
CERTIFICATE OF CORRECTION

PATENT NO. : 7,881,818 B2
APPLICATION NO. : 11/537282
DATED : February 1, 2011
INVENTOR(S) : Van Bael et al.

Page 1 of 1

It is certified that error appears in the above-identified patent and that said Letters Patent is hereby corrected as shown below:

In Column 15, line 7, after "factor denoted d, with", kindly replace "$0<d<1$" with --$0<d\leq1$--.

In Column 22, line 38, before "ILLUSTRATOR™", kindly delete "Illustrator".

In Column 24, line 33, after "The carrier medium", kindly replace "carries" with --stores--.

Signed and Sealed this
Eighth Day of March, 2011

David J. Kappos
*Director of the United States Patent and Trademark Office*